US012511742B2

United States Patent
Song et al.

(10) Patent No.: US 12,511,742 B2
(45) Date of Patent: Dec. 30, 2025

(54) CONNECTED MACHINE-LEARNING MODELS WITH JOINT TRAINING FOR LESION DETECTION

(71) Applicants: GENENTECH, INC., South San Francisco, CA (US); HOFFMANN-LA ROCHE INC., Little Falls, NJ (US)

(72) Inventors: Zhuang Song, Albany, CA (US); Nils Gustav Thomas Bengtsson, San Francisco, CA (US); Richard Alan Duray Carano, San Ramon, CA (US); David B. Clayton, Mountain View, CA (US); Alexander James Stephen Champion De Crespigny, Redwood City, CA (US); Laura Gaetano, Basel (CH); Anitha Priya Krishnan, Belmont, CA (US)

(73) Assignees: Genentech, Inc., South San Francisco, CA (US); Hoffmann-La Roche Inc., Little Falls, NJ (US)

(*) Notice: Subject to any disclaimer, the term of this patent is extended or adjusted under 35 U.S.C. 154(b) by 383 days.

(21) Appl. No.: 18/174,929

(22) Filed: Feb. 27, 2023

(65) Prior Publication Data

US 2023/0281809 A1 Sep. 7, 2023

Related U.S. Application Data

(63) Continuation of application No. PCT/US2021/048486, filed on Aug. 31, 2021.

(Continued)

(51) Int. Cl.
*G06T 7/00* (2017.01)
*G06T 7/11* (2017.01)

(52) U.S. Cl.
CPC ............. *G06T 7/0012* (2013.01); *G06T 7/11* (2017.01); *G06T 2207/10088* (2013.01);
(Continued)

(58) Field of Classification Search
CPC .............. G06T 7/0012; G06T 7/11; G06T 2207/10088; G06T 2207/20084;
(Continued)

(56) References Cited

U.S. PATENT DOCUMENTS

2018/0232887 A1* 8/2018 Lin .......................... G06T 7/11
2020/0058126 A1* 2/2020 Wang ..................... G06N 3/045
(Continued)

FOREIGN PATENT DOCUMENTS

WO 2022051290 A1 3/2022

OTHER PUBLICATIONS

Abd-Ellah et al., "TPUAR-Net: Two Parallel U-Net with Asymmetric Residual-Based Deep Convolutional Neural Network for Brain Tumor Segmentation", Advances in Databases and Information Systems; Lecture Notes In Computer Science, Aug. 3, 2019, pp. 106-116.
(Continued)

*Primary Examiner* — Van D Huynh
(74) *Attorney, Agent, or Firm* — Kilpatrick Townsend & Stockton LLP

(57) ABSTRACT

Embodiments disclosed herein generally relate to connected machine learning models with joint training for lesion detection. Particularly, aspects of the present disclosure are directed to accessing a three-dimensional magnetic resonance imaging (MRI) image, wherein the three-dimensional MRI image depicts a region of a brain of a subject, wherein the region of the brain includes at least a first type of lesions and a second type of lesions; inputting the three-dimensional MRI image into a machine-learning model comprising a first
(Continued)

convolutional neural network and a second convolutional neural network; generating a first segmentation mask for the first type of lesions using the first convolutional neural network that takes as input the three-dimensional MRI image; generating a second segmentation mask for the second type of lesions using the second convolutional neural network that takes as input the three-dimensional MRI image; and outputting the first segmentation mask and the second segmentation mask.

20 Claims, 6 Drawing Sheets

Related U.S. Application Data

(60) Provisional application No. 63/073,686, filed on Sep. 2, 2020.

(52) U.S. Cl.
CPC ............... *G06T 2207/20084* (2013.01); *G06T 2207/30016* (2013.01); *G06T 2207/30096* (2013.01)

(58) Field of Classification Search
CPC . G06T 2207/30016; G06T 2207/30096; G06T 7/0016; G06T 2200/04; G06T 2207/20081; G06T 2207/30242; G06T 7/0014; G06T 7/136; G06T 7/174; G06N 3/044; G06N 3/045; G06N 3/084; G06N 3/08; G06N 3/0464
See application file for complete search history.

(56) References Cited

U.S. PATENT DOCUMENTS

| | | | | |
|---|---|---|---|---|
| 2020/0085382 A1* | 3/2020 | Taerum | ................ | A61B 5/7264 |
| 2020/0167928 A1* | 5/2020 | Heindl | ................... | A61B 5/055 |
| 2020/0167929 A1* | 5/2020 | Wang | ...................... | G06T 7/194 |
| 2020/0184647 A1* | 6/2020 | Harrison | ................ | G16H 30/40 |
| 2020/0302596 A1* | 9/2020 | Yoo | ............................ | G06T 7/11 |
| 2021/0035287 A1* | 2/2021 | Kim | ........................ | G06N 3/045 |
| 2021/0248751 A1* | 8/2021 | Guo | .......................... | G06T 7/11 |
| 2021/0272290 A1* | 9/2021 | Keshwani | ................ | A61B 6/03 |
| 2022/0005586 A1* | 1/2022 | Brynolfsson | .......... | G16H 30/40 |
| 2022/0051402 A1* | 2/2022 | Dikici | ................... | G06F 18/217 |

OTHER PUBLICATIONS

Brugnara, et al., "Automated volumetric assessment with artificial neural networks might enable a more accurate assessment of disease burden in patients with multiple sclerosis," European Radiology, vol. 30, No. 4, pp. 2356-2364, 2020.

Casamitjana et al., "Cascaded V-Net using ROI Masks for Brain Tumor Segmentation", Arxiv.org, Cornell University Library, 201 Olin Library Cornell University Ithaca, NY, Dec. 30, 2018, 12 pages.

Coronado, et al., "Deep Learning Segmentation of Gadolinium Enhancing Lesions in Multiple Sclerosis," Multiple Sclerosis Journal, Apr. 2021, 27(4): 519-527.

Karimaghaloo et al., "Temporal Hierarchical Adaptive Texture CRF for Automatic Detection of Gadolinium-Enhancing Multiple Sclerosis Lesions in Brain MRI," IEEE Transactions on Medical Imaging, vol. 34, No. 6, pp. 1227-1241, 2015.

Pereira et al., "On Hierarchical Brain Tumor Segmentation in Mri Using Fully Convolutional Neural Networks: A Preliminary Study", 2017 IEEE 5th Portuguese Meeting GN Bioengineering (Enbeng), IEEE, Feb. 16, 2017, pp. 1-4.

Valverde et al., "Improving Automated Multiple Sclerosis Lesion Segmentation with a Cascaded 3D Convolutional Neural Network Approach", Neuroimage, Elsevier, Amsterdam, vol. 155, Feb. 17, 2017, 10 pages.

Velickovic et al., "X-CNN: Cross-modal Convolutional Neural Networks for Sparse Datasets", 2016 IEEE Symposium Series on Computational Intelligence (SSCI), IEEE, Dec. 6, 2016, pp. 1-8.

Unknown Author, "Module: tf.keras", https://www.tensorflow.org/versions/r2.1/api_docs/python/tf/keras, last updated Oct. 1, 2020, accessed from the Internet Mar. 17, 2023, 3 pages.

* cited by examiner

CONNECTED MACHINE-LEARNING MODELS WITH JOINT TRAINING FOR LESION DETECTION

CROSS-REFERENCE TO RELATED APPLICATIONS

This application is a continuation of International Application No. PCT/US2021/048486, filed on Aug. 31, 2021, which claims the benefit of and priority to U.S. Provisional Patent Application No. 63/073,686, filed on Sep. 2, 2020. Each of these applications is hereby incorporated by reference in its entireties for all purposes.

BACKGROUND

Multiple sclerosis (MS) is a disease that affects the central nervous system. Lesions form in the brains of subjects with MS as a result of the disease. The vast majority of the time, MS initially presents as relapse-remitting MS, which is characterized by a separation in space and time. For example, a subject may experience multiple symptomatic episodes that are affecting different body areas and/or different functional systems. As another example, a subject may experience lesions in different parts of the central nervous system. As yet another example, a subject may experience a symptom and have a lesion in a brain area that does not correspond to the system. Over time, MS subjects' lesion size and count frequently increases, reflecting a worsening of the disease. Relapse-remitting MS typically eventually progresses to secondary progressive MS, during which a gradual worsening of symptoms and brain health is observed rather than discrete symptomatic relapses and recovery episodes. Primary progressive MS similarly is characterized by the gradual symptom worsening and brain degradation, though this diagnosis is reserved for subjects who did not previously experience the relapse-remitting form.

Magnetic resonance imaging (MRI) can provide visualization of new (contrast-enhanced) lesions, old lesions and brain atrophy (via brain-size changes). These metrics are bedrocks for supporting MS diagnoses, facilitating MS prognoses, selecting MS treatments, and evaluating MS treatments. MRI images are generated using MRI sequences, which are particular settings of radio frequency pulses and gradients that result in a particular image appearance. Three prominent MRI sequence types include a T1 sequence, a T2 sequence, and a fluid-attenuated inversion recovery (FLAIR) sequence.

T1 MRIs can be collected relatively quickly and provide structural information. Black holes—which are plaques indicative of axonal destruction and neuron death—appear dark in T1 scans. T2 MRIs are frequently used to show total disease burden. New and old lesions appear as hyperintense regions in T2 scans. FLAIR MRIs are similar to T2 MRIs, except that ventricles and cerebrospinal fluid are darkened in FLAIR MRIs (while they are bright in T2 MRIs). Thus, lesions that appear near ventricles (e.g., in the corpus callosum) are more visible in FLAIR MRIs.

In some instances, a contrast agent (e.g., gadolinium) is administered to a subject (e.g., intravenously) before one or more MRI scans are collected to improve the visibility of active lesions. If the blood-brain barrier is intact, the contrast will not pass into the central nervous system. If the blood-brain barrier is disrupted, the contrast can traverse into the central nervous system and will localize in areas of inflammation. The contrast will appear as hyperintense in T1 MRIs.

Traditionally, a radiologist would manually annotate MRI scans. However, there are many scans to annotate, given that scans are collected for different depths and perspectives in addition to the difference in sequence types. Further, there is a high degree of variability in annotations across radiologists. Thus, it would be advantageous to identify an automated technique that can process MRI images, so as to improve efficiency and consistency.

SUMMARY

In some embodiments, a computer-implemented method is provided. A three-dimensional magnetic resonance imaging (MRI) image is accessed. The three-dimensional MRI image depicts a region of a brain of a subject that includes at least a first type of lesions (e.g., T1 unenhancing lesions) and a second type of lesions (T1 Gd-enhancing lesions). The three-dimensional MRI image is input into a machine-learning model comprising a first convolutional neural network and a second convolutional neural network. The first convolutional neural network is connected to the second convolutional network with one or more cross network connections between one or more layers of the first convolutional neural network and one or more layers of the second convolutional neural network. A first segmentation mask for the first type of lesions is generated using the first convolutional neural network that takes as input the three-dimensional MRI image(s). The first segmentation mask comprises first estimated segmentation boundaries around depictions of the first type of lesions. A second segmentation mask for the second type of lesions is generated using the second convolutional neural network that takes as input the three-dimensional MRI image(s). The second segmentation mask comprises second estimated segmentation boundaries around depictions of the second type of lesions. The first segmentation mask and the second segmentation mask are generated in parallel and a set of extracted features are shared across the one or more cross network connections while the first segmentation mask and the second segmentation mask are generated. The first segmentation mask and the second segmentation mask are output.

In some embodiments, the first convolutional neural network is connected to the second convolutional network with the one or more cross network connections from encoding blocks of the first convolutional neural network to encoding blocks of the second convolutional neural network.

In some embodiments, the first convolutional neural network is connected to the second convolutional network with the one or more cross network connections from decoding blocks of the first convolutional neural network to decoding blocks of the second convolutional neural network.

In some embodiments, each of the cross network connections comprises a feature transformation block and a compression block.

In some embodiments, the computer-implemented method can involve generating a final image mask by combining information from the first segmentation mask and the second segmentation mask. The final image mask comprises estimated segmentation boundaries around depictions of a new set of lesions that are representative of a combination of the first type of lesions and the second type of lesions. The final image mask is output.

In some embodiments, the first convolutional neural network and the second convolutional network were trained using a loss function comprising a combination of a Tversky loss and a weighted binary cross entropy loss.

In some embodiments, the first convolutional neural network comprises a plurality of model parameters identified using a set of training data comprising a plurality of medical images with annotations associated with segmentation boundaries around depictions of different types of lesions including the first type of lesions and the second type of lesions. The plurality of model parameters are identified using the set of training data based on minimizing the loss function.

In some embodiments, the second convolutional neural network comprises a plurality of model parameters identified using the set of training data. The second convolutional neural network is trained jointly with the first convolutional neural network such that the plurality of model parameters of the second convolutional neural network are cooperatively identified using the set of training data based on minimizing the loss function.

In some embodiments, the loss function further comprises penalty terms for any overlap between the first type of lesions and the second type of lesions and contribution of false positives from the first convolutional neural network and the second convolutional neural network.

In some embodiments, the first convolutional neural network and the second convolutional network are U-Nets.

In some embodiments, the first convolutional neural network comprises three layers of encoding blocks and decoding blocks.

In some embodiments, the second convolutional neural network comprises three layers of encoding blocks and decoding blocks.

In some embodiments, the three-dimensional MRI image comprises multiple contiguous slices stacked along a channel dimension. The slices comprise a first three-dimensional MRI slice generated using a first type of MRI sequence (e.g., T1 post-contrast), a second three-dimensional MRI slice generated using a second type of MRI sequence (e.g., T1 pre-contrast), and a third three-dimensional MRI slice generated using a third type of MRI sequence (e.g., fluid-attenuated inversion recovery).

In some embodiments, the first three-dimensional MRI slice and the second three-dimensional slice are normalized to capture contrast enhancement. The normalization comprises using a mean and standard deviation of the second three-dimensional slice to z-score both a first three-dimensional MRI slice volume and a second three-dimensional slice volume.

In some embodiments, the computer-implemented method may include determining a count of a number of the first type of lesions using the first segmentation mask and a count of a number of the second type of lesions using the second segmentation mask.

In some embodiments, the computer-implemented method may include determining a count of a number of the first type of lesions using the first segmentation mask, a count of a number of the second type of lesions using the second segmentation mask, and/or a count of a number of lesion within the new set of lesions using the final image mask.

In some embodiments, the computer-implemented method may include determining one or more lesion sizes or a lesion load using the first segmentation mask, the second segmentation mask, and/or the final image mask.

In some embodiments, the computer-implemented method may include accessing data corresponding to a previous MRI, determining a change in a quantity, a size or cumulative size of one or more lesions using the first segmentation mask, the second segmentation mask, and/or the final image mask and the data, and generating an output that represents the change.

In some embodiments, the computer-implemented method may include recommending changing a treatment strategy based on the first segmentation mask, the second segmentation mask, and/or the final image mask.

In some embodiments, the computer-implemented method may include providing an output corresponding to a possible or confirmed diagnosis of the subject of multiple sclerosis based at least in part on the first segmentation mask, the second segmentation mask, and/or the final image mask.

In some embodiments, the computer-implemented method may include diagnosing the subject with multiple sclerosis based at least in part on the first segmentation mask, the second segmentation mask, and/or the final image mask.

In some embodiments, the computer-implemented method may include evaluating and/or predicting treatment response based at least in part on the first segmentation mask, the second segmentation mask, and/or the final image mask.

In some embodiments, a computer-implemented method is provided. A three-dimensional MRI image is accessed. The three-dimensional MRI image depicts a region of a brain of a subject including at least a first type of lesion and a second type of lesion. The three-dimensional MRI image is input into a machine-learning model comprising a first convolutional neural network connected to a second convolutional neural network. A first segmentation mask for the first type of lesion is generated using the first convolutional neural network that takes as input the three-dimensional MRI image. A second segmentation mask for the second type of lesion is generated using the second convolutional neural network that takes as input the first segmentation mask on the three-dimensional MRI image. A final image mask is generated by combining information from the first segmentation mask and the second segmentation mask. The final image mask comprises a first estimated segmentation boundary around depictions of the first type of lesion and/or a second estimated segmentation boundary around depictions of the second type of lesion. The final image mask is output.

Some embodiments of the present disclosure include a system including one or more data processors. The system can further include a non-transitory computer readable storage medium containing instructions which, when executed on the one or more data processors, cause the one or more data processors to perform part or all of one or more of the methods disclosed herein.

In some embodiments, a computer-program product is provided that is tangibly embodied in a non-transitory machine-readable storage medium. The computer-program product can include instructions configured to cause one or more data processors to perform part or all of one or more of the methods disclosed herein.

DETAILED DESCRIPTION

I. Overview

Figure 1:
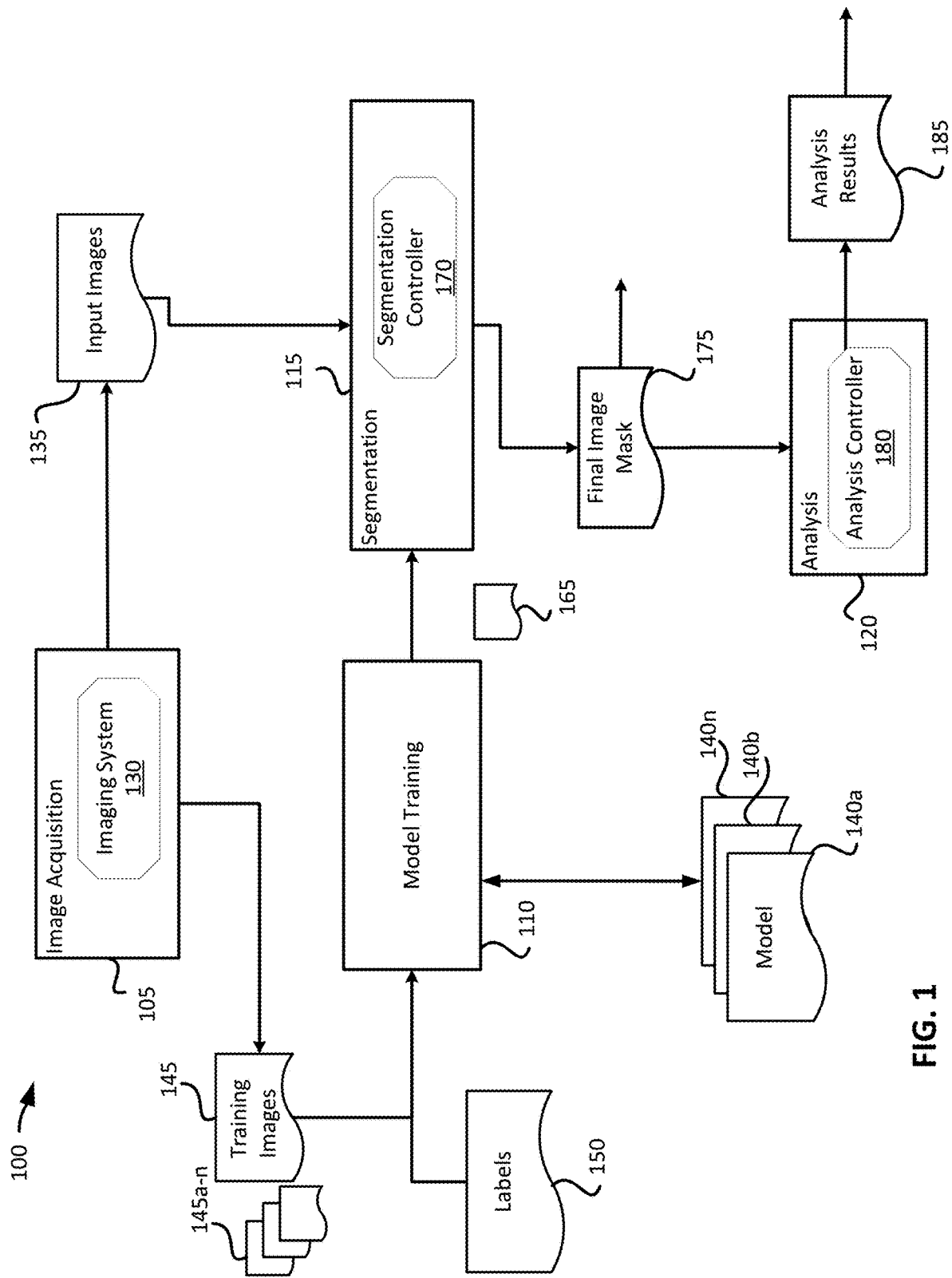
FIG. 1 illustrates an example computing environment for segmenting depictions of different types of lesions within images using a model having multiple connected networks according to various embodiments.

The present disclosure describes techniques for automated lesion segmentation of medical images. More specifically, embodiments of the present disclosure provide techniques for segmenting depictions of different type of lesions (e.g., unenhancing and gadolinium (Gd)-enhancing T1 lesions) within medical images (e.g., pre and post contrast T1w images) using jointly trained deep learning networks with connections between the deep learning networks.

In MS, various deep learning models have been developed for segmenting depictions of T2 hyperintense lesions and recently separate deep learning models have been developed for segmenting depictions of T1 Gd-enhancing lesions. However, the use of two independent deep learning models does not sufficiently capture the disjoint/non-overlapping nature of depictions of T1 unenhancing and Gd-enhancing lesion types especially for lesions with low contrast enhancement, which leads to an increase in the number of false positive (FP) lesions. Due to a large imbalance in lesion prevalence and sizes, using one deep learning model for segmenting depictions of both lesions in a multi class setting is challenging as the deep learning model learns to segment only depictions of the lesion types with high prevalence. In addition, there might be less overlap in the features needed for segmenting depictions of these two types of T1 lesions as they have considerable differences in their shape characteristics and might not occur adjacent to each other in MS.

To address these limitations and problems, the techniques for automated object segmentation of the present embodiments utilize multiple (e.g., two or more) deep learning networks trained jointly for segmenting depictions of different types of lesions such as unenhancing and Gd-enhancing T1 lesions. For example, a data processing system accesses a three-dimensional MRI image. The three-dimensional MRI image depicts a region of a brain of a subject, and the region of the brain includes at least a first type of lesion (e.g., an unenhancing lesion) and a second type of lesion (e.g., a Gd-enhancing lesion). The three-dimensional MRI image is input into a machine-learning model comprising multiple connected networks such as a first convolutional neural network connected to a second convolutional neural network. The first convolutional neural network may be connected to the second convolutional network with one or more cross network connections between one or more layers of the first convolutional neural network and one or more layers of the second convolutional neural network. The first convolutional neural network is configured to generate a first segmentation mask for the first type of lesion using as input the three-dimensional MRI image(s). The first segmentation mask comprises first estimated segmentation boundaries around depictions of the first type of lesions. The second convolutional neural network is configured to generate a second segmentation mask for the second type of lesion using as input the three-dimensional MRI image(s). The second segmentation mask comprises second estimated segmentation boundaries around depictions of the second type of lesions. The first segmentation mask and the second segmentation mask are generated in parallel and a set of extracted features are shared across the cross network connections while the first segmentation mask and the second segmentation mask are generated. The first segmentation mask and the second segmentation mask may be output and further analyzed downstream (e.g., used to determine a number of lesions of each type using the first and second segmentation masks).

II. Techniques for Segmenting Medical Images

Image segmentation is a procedure to separate images into portions showing resemblance in different features like shape, size, color, etc. Segmentation of depictions of lesions allows visualization of the size and position of a lesion within a region of the body (e.g., the brain), and may also provide a basis for analysis of treatment. The gold standard of lesion segmentation has long been manual segmentation, which is time-consuming and labor-intensive, and thus unsuitable for large studies. Considerable research has been done to attempt to fully or partially automate the process of lesion segmentation. For example, image segmentation techniques such as thresholding, region growing, fuzzy clustering, use of the watershed algorithm, etc., have been used for separating depictions of abnormal tissues (e.g., lesions) from depictions of normal tissues, such as white matter (WM), gray matter (GM), and cerebrospinal fluid (CSF) of the brain. Nonetheless, the process of segmentation is still challenging due to the diversity of shape, location, and size of the depictions of lesions.

Described herein is an end-to-end method incorporating a model that uses multiple three-dimensional convolutional neural networks (CNNs) to segment depictions of lesions and extract treatment response based on lesion segmentation (e.g., T1 Gd-enhancing lesion segmentation). The developed model is computationally light (e.g., can run on an average desktop computing device and return predictions on-demand such as e.g., within a few minutes) and devised to accommodate the complexity of three-dimensional scans, extreme imbalance between various lesion types, and the heterogeneous nature (e.g., variable density and object sizes) of the input images. As used herein, a "scan" is a graphical representation of signal on a single plane through the body of a subject. The model has comparable performance for lesion segmentation to conventional algorithms relying on manual intervention (e.g., manual selection of seeds or manual identification of bounding boxes) such as a thresholding method, an edge based segmentation method, or a region based segmentation method and demonstrates a high correlation to ground truth manual reads.

The prediction or lesion information obtained by the lesion segmentation may, in turn, be used alone or in conjunction with other factors to determine a number of lesions (e.g., a number of T1 unenhancing lesion and/or T1 Gd-enhancing lesions), and/or determine one or more lesion sizes or a lesion burden (sometime called a lesion load). The method may also be used to evaluate the clinical efficacy of a treatment and/or prognosis of a subject. The method may also be used to determine a change in a quantity, a size, or cumulative size of one or more lesions using the prediction and the data and generate an output that represents the change. The output of the model can further be used to recommend changing a treatment strategy based on the prediction. The method may also be used to provide a diagnosis of a subject, for example, providing an output corresponding to a possible or confirmed diagnosis of the subject of multiple sclerosis based at least in part on the prediction or diagnosing the subject with multiple sclerosis based at least in part on the prediction.

II.A. Example Computing Environment

FIG. 1 illustrates an example computing environment 100 (i.e., a data processing system) for segmenting depictions of different types of lesions within images using a model having multiple connected networks according to various embodiments. As shown in FIG. 1, the segmenting performed by the computing environment 100 in this example includes several stages: an image acquisition stage 105, a model training stage 110, a segmentation stage 115, and an analysis stage 120.

The image acquisition stage 105 includes one or more imaging systems 130 (e.g., an MRI imaging system) for obtaining input images 135 (e.g., MRI images) of various parts of a subject. The imaging systems 130 are configured to use radiological imaging techniques such as MRI and the like to obtain the input images 135. The imaging systems 130 are able to determine the difference between various structures and functions within the subject based on characteristics (e.g., brightness, contrast, and spatial resolution) associated with each of the imaging systems 130 and generate a series of two-dimensional images. Once the series of two-dimensional images are collected by the scanner's computer, the two-dimensional images can be digitally "stacked" together by computer analysis to reconstruct a three-dimensional image of the subject or a portion of the subject. The two-dimensional images and/or the reconstructed three-dimensional input images 135 allow for easier identification and location of basic structures (e.g., organs) as well as possible lesions or abnormalities. Each two-dimensional image and/or the reconstructed three-dimensional input image 135 may correspond to a session time and a subject and depict an interior region of the subject. Each two-dimensional image and/or the reconstructed three-dimensional input image 135 may further be of a standardized size, resolution, and/or magnification.

The model training stage 110 builds and trains one or more models 140a-140n ('n' represents a total number of models)(which may be referred to herein individually as a model 140 or collectively as the models 140) to be used by the other stages. The model 140 can be a machine-learning ("ML") model comprising multiple networks, such as a convolutional neural network ("CNN"), e.g. an inception neural network, a residual neural network ("Resnet"), a U-Net, a V-Net, a single shot multibox detector ("SSD") network, or a recurrent neural network ("RNN"), e.g., long short-term memory ("LSTM") models or gated recurrent units ("GRUs") models, or any combination thereof. The model 140 can also be any other suitable ML model trained in object detection and/or segmentation from images, such as a three-dimensional CNN ("3DCNN"), a dynamic time warping ("DTW") technique, a hidden Markov model ("HMM"), etc., or combinations of one or more of such techniques— e.g., CNN-HMM or MCNN (Multi-Scale Convolutional Neural Network). The computing environment 100 may employ the same type of model or different types of models for segmenting depictions of different type of lesions. In certain instances, model 140 is constructed with a combined asymmetric loss function, e.g., a combination of Tversky loss and weighted binary cross entropy (wBCE) loss for training each network. For joint training of networks within a model 140, in addition to the losses for the networks, penalty terms may be added for any overlap between lesion types and contribution of false positives from the networks.

To train a model 140 in this example, training images 145 are generated by acquiring digital images, splitting the images into a subset of training images 145a for training (e.g., 90%) and a subset of training images 145b for validation (e.g., 10%), preprocessing the subset of training images 145a and the subset of training images 145b, augmenting the subset of training images 145a, and in some instances annotating the subset of training images 145a with labels 150. The subset of training images 145a are acquired from one or more imaging modalities (e.g., MRI T1, T2, proton density (PD), or FLAIR). In some instances, the subset of training images 145a are acquired from a data storage structure such as a database, an image system (e.g., one or more imaging systems 130), or the like associated with the one or more imaging modalities. Each image depicts one or more lesions.

The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. The preprocessing may comprise bias field correction for correcting low frequency intensity non-uniformity present in MRI image data known as a bias or gain field. In some instances, the preprocessing may comprise identifying MRI baseline image transformations into MNI template images (e.g., MNI space) using rigid registration. In some instances, the preprocessing may comprise rigid registration of the follow up visits to baseline and skull stripping. In some instances, the preprocessing may further comprise standardization or normalization to put all features on a same scale (e.g., a same size scale or a same color scale or color saturation scale). In certain instances, the images are resized with a minimum size (width or height) of predetermined pixels (e.g., 2500 pixels) or with a maximum size (width or height) of predetermined pixels (e.g., 3000 pixels) and kept with the original aspect ratio.

Augmentation can be used to artificially expand the size of the subset of training images 145a by creating modified versions of images in the datasets. Image data augmentation may be performed by creating transformed versions of images in the datasets that belong to the same class as the original image. Transforms include a range of operations from the field of image manipulation, such as shifts, flips, zooms, and the like. In some instances, the operations include random erasing, shifting, brightness, rotation, Gaussian blurring, and/or elastic transformation to ensure that the model 140 is able to perform under circumstances outside those available from the subset of training images 145*a*.

Annotation can be performed manually by one or more humans (annotators such as a radiologists or pathologists) confirming the presence of depictions of one or more lesions in each image of the subset of training images 145*a* and providing labels 150 to the one or more lesions, for example, drawing a bounding box (a ground truth) or segmentation boundary, using annotation software, around the area confirmed by the human to include the depictions of the one or more lesions. In certain instances, the bounding box or segmentation boundary may only be drawn for instances that have a greater than 50% in probability of being a lesion. For the images, which are annotated by multiple annotators, the bounding boxes or segmentation boundaries from all annotators may be used. In some instances, annotation data may further indicate a type of a lesion. For example, for various type of lesions, the annotation data may indicate the type, such as T2 hyperintense lesions or T1 hypointense lesions.

In some instances, a subset of training images 145 may be transmitted to an annotator device to be included within a training data set (i.e., the subset of training images 145*a*). Input may be provided (e.g., by a radiologist) to the annotator device using (for example) a mouse, track pad, stylus and/or keyboard that indicates (for example) whether the image depicts an object of interest (e.g., a lesion, an organ, etc.); a number and type of lesions depicted within the image; and a perimeter (bounding box or segmentation boundary) of each depicted lesion within the image. Annotator device may be configured to use the provided input to generate labels 150 for each image. For example, the labels 150 may include a number and/or type of lesions depicted within an image; a type classification for each depicted lesion; a number of each depicted lesion of a particular type; and a perimeter and/or mask of one or more identified lesions within an image. In some instances, labels 150 may further include a perimeter and/or mask of one or more identified lesions overlaid onto a medical image.

In some instances, the models 140 are trained and used to process a digital image of a three-dimensional (3D) patch of a brain. Training data includes a first subset of training MRI images that each depicts at least part of one or more lesions and a second subset of training MRI images that each lack depiction of any lesions. The training data can include images generated using different MRI sequence types. For example, the training dataset can include three-dimensional MRI images generated using a T1 sequence, a T2 sequence, and a FLAIR sequence. The training data can include labels for MRI images depicting lesions and MRI images not depicting lesions. The labels may be received, identified or derived from data received from a database or a provider system. Label data can include (for example)—for a single image—an indication as to whether the image depicts at least part of a lesion, a quantity of lesions at least partly depicted in the image, locations within the image (e.g., particular voxels) that depict at least part of a lesion, a type of lesion (e.g., an enhancing lesion or unenhancing lesion) at least partly depicted at a particular location within the image or within the image, etc.

Training data used to train the models 140 may include MRI images collected after a contrast agent, such as gadolinium (Gd), was administered to a subject, MRI images that depict at least part of one or more contrast-enhanced lesions (referred to as Gd-enhancing lesions), MRI images collected without a contrast agent having been administered to a subject, MRI images collected before a contrast agent was administered to a subject, and/or MRI images that do not depict any contrast-enhanced lesions. For example, a model 140 may be trained only with images collected without a contrast agent having been recently administered to the subject, only with images collected after a contrast agent was recently administered to the subject, or with some of both types of images. It will be appreciated that an image collected after a contrast agent was administered may, in some instances, not depict any enhancing lesions in situations where the blood-brain barrier is intact and/or when a given scan does not depict a brain region to which contrast agent moved.

In certain instances, the models 140 are trained using a weighted binary cross entropy (wBCE) loss or a Tversky loss. Tversky loss may reduce false positives in the prediction and wBCE may help identify smaller lesions. Additionally, a combination of Tversky loss and wBCE loss may be used to calculate the loss. The following Equation (1) may be used for the Tversky loss:

$$TI = \frac{\sum_{i=1}^{N} p_{ic}g_{ic} + \epsilon}{\sum_{i=1}^{N} p_{ic}g_{ic} + (1-\beta)\sum_{i=1}^{N} p_{\overline{ic}}g_{ic} + \beta\sum_{i=1}^{N} p_{ic}g_{\overline{ic}} + \epsilon};$$

$$TL = 1 - TI,$$

Equation (1)

In the above Equation (1), $p_{ic}$ is the model predicted probability that voxel i belongs to the lesion class (e.g., T1 unenhancing, Gd-enhancing) and $p_{\overline{ic}}$ is the probability that the voxel does not belong to the lesion class. Similarly, $g_{ic}$ and $g_{\overline{ic}}$ indicates if the voxel belongs to the lesion class or not in the ground truth annotations. β weighs the contribution from false positives (FPs) and (i-β) weighs the contribution from false negatives (FNs). The following Equation (2) may be used for wBCE:

$$wBCE = -(a*g \log(p) + (1-g)\log(1-p))$$

Equation (2)

In the above Equation (2), g and p represent the ground truth and model predicted lesion masks, respectively. wBCE loss can be added to improve the sensitivity for detecting small lesions. However, wBCE can lead to increased FPs. To account for this, the FPs can be weighted more than FNs in the Tversky loss term. The loss is calculated using Equation (3):

$$l = TL + wBCE$$

Equation (3)

For joint training, in addition to the losses for the multiple networks, terms can be added for overlap of the two lesion types and contribution of false positives from the networks using Equation (4) as follows:

$$l_{joint} = a_1 l_u + a_2 l_e + a_3 (p_u * p_e) + a_4 p_u * (1-g_u) + a_5 p_e * (1-g_e)$$

Equation (4)

In the above Equation (4), $l_u$ and $l_e$ correspond to the loss of the top and bottom models for segmenting T1 unehancing and Gd-enhancing lesions, $p_u$ and $g_u$ correspond to the model predicted and ground truth (GT) masks for unenhancing lesions, and $p_e$ and $g_e$ correspond to the model predicted and GT masks for Gd-enhancing lesions. $l_e$ can be weighted more than $l_u$ to account for the lower prevalence of Gd-enhancing lesions.

The training process for model 140 includes selecting hyperparameters for the model 140 and performing iterative operations of inputting images from the subset of images 145*a* into the model 140 to find a set of model parameters (e.g., weights and/or biases) that minimizes a loss or error function for the model 140. The hyperparameters are settings that can be tuned or optimized to control the behavior of the model 140. Most models explicitly define hyperparameters that control different aspects of the models such as memory or cost of execution. However, additional hyperparameters may be defined to adapt a model to a specific scenario. For example, the hyperparameters may include the number of hidden units of a model, the learning rate of a model, the convolution kernel width, or the number of kernels for a model. Each iteration of training can involve finding a set of model parameters for the model 140 (configured with a defined set of hyperparameters) so that the value of the loss or error function using the set of model parameters is smaller than the value of the loss or error function using a different set of model parameters in a previous iteration. The loss or error function can be constructed to measure the difference between the outputs inferred using the models 140 and the ground truth segmentation boundary annotated to the images using the labels 150.

Once the set of model parameters are identified, the model 140 has been trained and can be validated using the subset of training images 145b (testing or validation data set). The validation process includes iterative operations of inputting images from the subset of training images 145b into the model 140 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of images from the subset of training images 145b are input into the model 140 to obtain output (in this example, the segmentation boundary around depictions of one or more lesions), and the output is evaluated versus ground truth segmentation boundaries using correlation techniques such as Bland-Altman method and the Spearman's rank correlation coefficients and calculating performance metrics such as the error, accuracy, precision, recall, receiver operating characteristic curve (ROC), etc.

As should be understood, other training/validation mechanisms are contemplated and may be implemented within the computing environment 100. For example, the model may be trained and hyperparameters may be tuned on images from the subset of training images 145a and the images from the subset of training images 145b may only be used for testing and evaluating performance of the model. Moreover, although the training mechanisms described herein focus on training a new model 140, these training mechanisms can also be utilized to fine tune existing models 140 trained from other datasets. For example, in some instances, a model 140 might have been pre-trained using images of other objects or biological structures or from sections from other subjects or studies (e.g., human trials or murine experiments). In those cases, the models 140 can be used for transfer learning and retrained/validated using the input images 135.

The model training stage 110 outputs trained models including one or more trained segmentation models 165 comprising multiple networks (e.g., a first U-Net connected to a second U-Net). One or more medical input images 135 are obtained by a segmentation controller 170 within the segmentation stage 115. In various instances, the medical input images 135 are three-dimensional MRI images. Each of the three-dimensional MRI images depict a same region of a brain of a subject. The region of the brain includes at least a first type of lesion (e.g., T1 unenhancing lesions) and a second type of lesion (e.g., T1 Gd-enhancing lesions). Each three-dimensional MRI image includes a three-dimensional patch of a full MRI image. The three-dimensional patch can be a subset of voxels of the full three-dimensional MRI image. In some instances, a first three-dimensional MRI image may be generated using a first type of MRI sequence that is different from a second type of MRI sequence used to generate a second three-dimensional MRI image. In certain instances, the three-dimensional MRI images obtained using different MRI sequences may be stacked and simultaneously used as input into the segmentation models 165. For example, multiple (e.g., three) contiguous slices generated using different MRI sequences such as FLAIR, T1 pre-contrast, and T1 post-contrast can be stacked along a channel dimension and simultaneously used as input into the segmentation models 165.

In some instances, the three-dimensional MRI images are preprocessed prior to being input into the segmentation models 165. For example, FLAIR MRI images can be intensity rescaled and z-scored. Additionally, to capture the increase in intensity of the lesions in T1 post-contrast images with respect to the T1 pre-contrast images, the volumes can be jointly normalized (e.g., rescaled maintaining the intensity relationship between the volumes). Both volumes can be z-scored using the mean and standard deviation of the brain in pre-contrast scans. The T1 post-contrast images and the T1 pre-contrast images can alternatively be normalized by z-score independently, similar to FLAIR MRI images, if relative contrast within a sequence is sufficient for a given output task.

The segmentation controller 170 includes processes for processing each three-dimensional MRI image using a trained segmentation model 165 comprising multiple connected networks. The trained segmentation model 165 may be deployed to the scanner or as a software in a cloud environment. In some instances, the multiple connected networks include a first convolutional neural network connected to a second convolutional neural network with one or more cross network connections between one or more layers of the first convolutional neural network and one or more layers of the second convolutional neural network. The cross network connections can facilitate lesion features of a first type of lesions (e.g., unenhancing lesions) to influence the selection of features for segmenting a second type of lesions (e.g., Gd-enhancing lesions). In an example, the features for segmenting the different types of lesions are only loosely coupled, mainly for large or rim-enhancing lesions, so the cross network connections may only be added on a contracting path of the multiple connected networks and not on an expansive path of the multiple connected networks. Feature transformation (e.g., 3×3×3) and compression (e.g., 1×1×1) blocks can also be added to adapt the lesion features of the first type of lesions to make them relevant for segmenting the second type of lesions. The compression blocks can include a set of convolution layer, batch norm layer, and activation layer. The output of the compression blocks can be concatenated to the output of an encoding block at a level similar in the first convolutional neural network for the second convolutional neural network. The concatenated features may then be provided as inputs to the encoding blocks at the next level of the second convolutional neural network for segmenting the second type of lesions.

In some embodiments, the multiple connected networks process each image in parallel. If each image is processed in parallel, the multiple connected networks process each image simultaneously or substantially simultaneously, and a set of extracted features are shared across the one or more cross network connections during the generating of the first segmentation mask and the second segmentation mask. This design configuration of connecting the first convolutional neural network for segmenting the first type of lesions (e.g., T1 unenhancing lesions) to the second convolutional neural network for segmenting the second type of lesions (e.g., T1 Gd-enhancing lesions) using the cross network connections is advantageous instead of vice versa or using shared layers. There may be a lower prevalence of the second type of lesions, so there may be little usable information in the absence of the second type of lesions in the other possible configurations. The processing comprises generating a first segmentation mask for the first type of lesions, using the first convolutional neural network that takes as input the three-dimensional MRI image. The first segmentation mask comprises first estimated segmentation boundaries around depictions of the first type of lesions. The processing further comprises generating a second segmentation mask for the second type of lesions, using the second convolutional neural network that takes as input the three-dimensional MRI image. The second segmentation mask comprises second estimated segmentation boundaries around depictions of the second type of lesions. The segmentation controller 170 may generate a final image mask 175 by combining information from the first segmentation mask and the second segmentation mask. The final image mask 175 includes estimated segmentation boundaries around depictions of a new set of legions that are representative of a combination of the first type of lesions and the second type of lesions. The segmentation controller 170 further includes processes for outputting the first segmentation mask, the second segmentation mask, and/or the final image mask 175.

In other embodiments, the multiple connected networks process each image in a cascade type arrangement (e.g., sequentially or substantially sequentially) and a set of extracted features are shared with the subsequent network from the preceding network. The processing comprises (i) generating the first segmentation mask for the first type of lesion using the using the first convolutional neural network that takes as input the three-dimensional MRI image, (ii) generating the second segmentation mask for the second type of lesion, using the second convolutional neural network that takes as input the first segmentation mask on the three-dimensional MRI image, and (iii) generating a final image mask 175 by combining the information from the first segmentation mask and the second segmentation mask. The final image mask 175 comprises a first estimated segmentation boundary around depictions of the first type of lesion and/or a second estimated segmentation boundary around the second type of lesion. The segmentation controller 170 further includes processes for outputting the final image mask 175.

The first segmentation mask, the second segmentation mask, and/or the final image mask 175 may be transmitted to an analysis controller 180 within the analysis stage 120. The analysis controller 180 includes processes for obtaining or receiving the first segmentation mask, the second segmentation mask, and/or the final image mask 175 and determining analysis results 185 based on the first segmentation mask, the second segmentation mask, and/or the final image mask 175. The analysis controller 180 may further include processes for determining a number of the first type of lesions using the first segmentation mask, a number of the second type of lesions using the second segmentation mask, and/or a number of lesions within the new set of lesions using the final image mask 175. The analysis controller 180 may further include processes for determining one or more lesion sizes or a lesion load using the first segmentation mask, the second segmentation mask, and/or the final image mask 175. The analysis controller 180 may further include processes for accessing data corresponding to a previous MRI, determining a change in a quantity, a size or cumulative size of one or more lesions using the first segmentation mask, the second segmentation mask, and/or the final image mask 175 and the data, and generating an output that represents the change. The analysis controller 180 may further include processes for recommending changing a treatment strategy based on the first segmentation mask, the second segmentation mask, and/or the final image mask 175. The analysis controller 180 may further include processes for providing an output corresponding to a possible or confirmed diagnosis of the subject of multiple sclerosis based at least in part on the first segmentation mask, the second segmentation mask, and/or the final image mask 175. The analysis controller 180 may further comprise processes for diagnosing the subject with multiple sclerosis based at least in part on the first segmentation mask, the second segmentation mask, and/or the final image mask 175. The analysis controller 180 may further comprise processes for evaluating and/or predicting treatment response based at least in part on the first segmentation mask, the second segmentation mask, and/or the final image mask 175.

It will be appreciated that the machine-learning models disclosed herein may be trained and used to detect depictions of various types of lesions. For example, non-enhancing T2 lesions may be detected, enhancing T1 lesions may be detected, etc. In some instances, the machine learning models disclosed herein may be trained and used to detect black holes.

In some embodiments, false positive predictions can be reduced using blood vessel tracking. Blood vessels can contribute to a significant proportion of the false positives for Gd-enhancing lesions. Region growing can be used for voxels having intensity in the top third percentile ($>=97^{th}$) of voxels within the brain in T1 post-contrast images. The largest vessel tree can be retained, and the boundaries of the brain can be enhanced. Lesions that overlap the vessel tree by more than a predefined threshold (e.g., 30%) can be removed to reduce the number of false positives.

While not explicitly shown, it will be appreciated that the computing environment 100 may further include a developer device associated with a developer. Communications from a developer device to components of the computing environment 100 may indicate what types of input images are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

II.B. Exemplary Model Comprising Multiple Connected Networks

Figure 2:
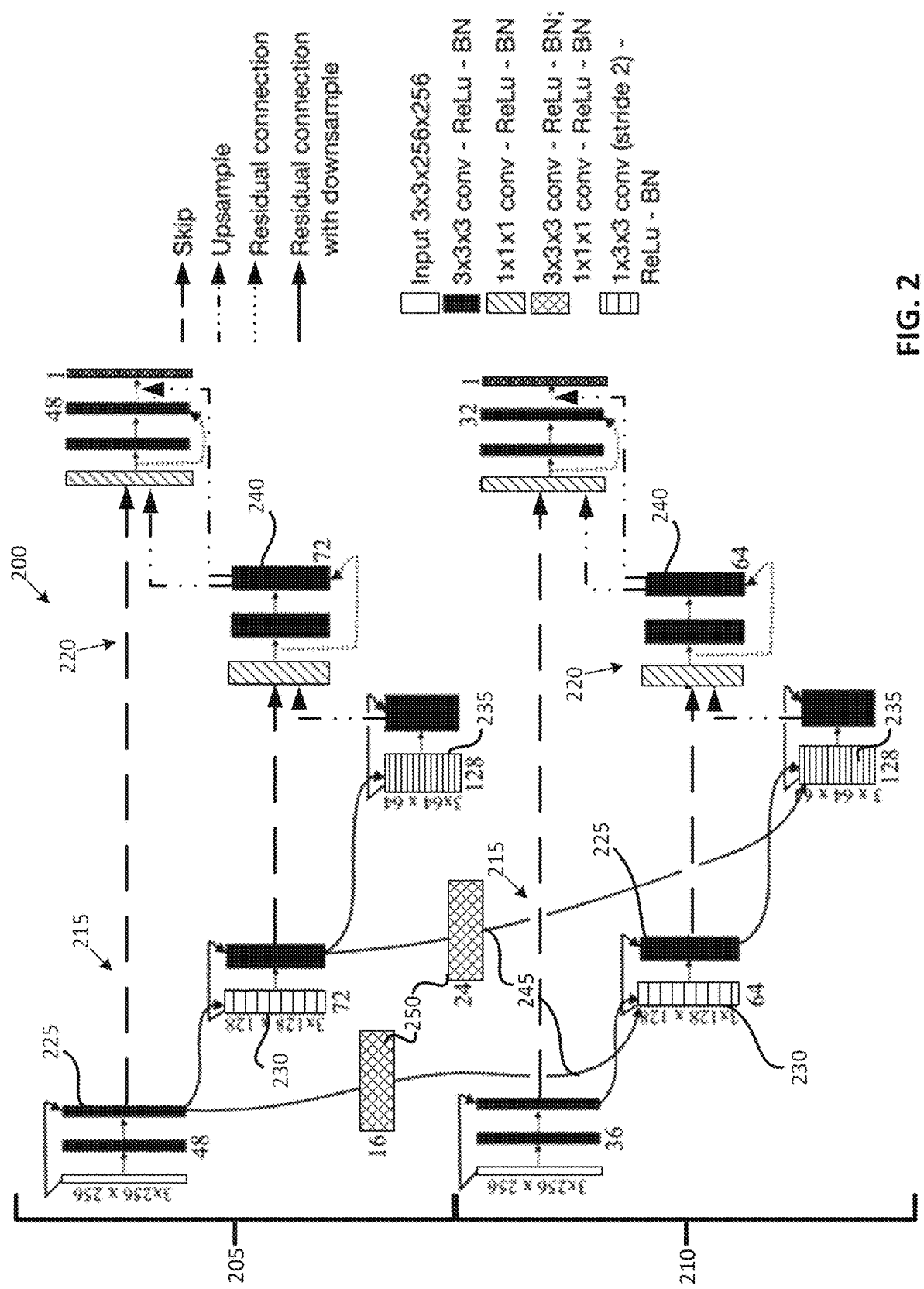
FIG. 2 shows an exemplary model comprising a first modified U-Net used to segment depictions of unenhancing lesions and a second modified U-Net used to segment depictions of Gd-enhancing lesions according to various embodiments.

In an exemplary embodiment shown in FIG. 2, multiple networks within a machine-learning model can be collectively used to detect different types of lesions depicted in three-dimensional MRI images. FIG. 2 shows an exemplary model 200 comprising a first modified U-Net 205 used to segment unenhancing lesions and a second modified U-Net 210 used to segment Gd-enhancing lesions. The modified U-Nets 205; 210 are relatively shallow with three levels. The modified U-Nets 205; 210 each include a contracting path 215 (encoder) and an expansive path 220 (decoder), which gives the networks the u-shaped architecture. Each encoding block 225 of the contracting path 215 is comprised of two sets of a convolution (3×3×3 kernels) layer, a batch norm layer, and a rectified linear unit (ReLU) activation layer. The modified U-Nets 205; 210 use dropout layers during training to avoid overfitting and residual connections for easy propagation of gradients during backpropagation. Each network extracts features in the contracting path 215 with progressively increasing number of feature maps at each scale. The feature maps are downsampled using strided convolutions with anisotropic kernels 230 (1×3×3) to account for the limited coverage along the slice dimension. Correspondingly, in the contracting path 215 the feature maps are upsampled (1×2×2) using interpolation layers 235. The skip features from the contracting path 215 with fine-grained details are concatenated with the upsampled semantic features and the combined features are refined using residual convolution blocks 240 similar to the ones used in the contracting path 215. The decoding block features at the top level are concatenated with the upsampled refined features from the middle level and passed through the final convolution and activation layers to generate the lesion segmentation probabilities.

The modified U-Nets 205; 210 are linked by cross network connections 245 from the encoding blocks of the first modified U-Net 205 for segmenting unenhancing lesions to the encoding blocks of the second modified U-Net 210 for segmenting Gd-enhancing lesions. The cross network connections 245 may additionally connect decoding blocks of the first modified U-Net 205 to decoding blocks of the second modified U-Net 210. These cross network connections 245 allow unenhancing lesion features to influence Gd-enhancing lesion features. The extracted features can be shared across the cross network connections 245 so that a first segmentation mask for depictions of unenhancing lesions can be generated in parallel to a second segmentation mask for depictions of Gd-enhancing lesions. This design configuration of connecting the first modified U-Net 205 for segmenting unenhancing lesions to the second modified U-Net 210 for segmenting Gd-enhancing lesions using the cross network connections 245 is advantageous instead of vice versa or using shared layers. This is due to the lower prevalence of Gd-enhancing lesions, meaning there may be no usable information in the absence of Gd-enhancing lesions in the other possible configurations. Additionally, the modified U-Nets 205; 210 can be jointly trained by minimizing a loss function. Penalty terms may be included in the loss function for any overlap between lesion types and a contribution of false positives from the modified U-Nets 205; 210, resulting in reduced false positives for smaller and weakly enhancing lesions.

In an example, the features for segmenting the different types of lesions are only loosely coupled, mainly for large or rim-enhancing lesions, so the cross network connections 245 are added only on the contracting path 215 and not on the expansive path 220. Feature transformation (3×3×3) and compression (1×1×1) blocks 250 are also added to adapt the unenhanced lesion features to make them relevant for segmenting Gd-enhancing lesions. Each of the blocks 250 includes a set of convolution layer, batch norm layer, and activation layer. The output of the compression block 250 is concatenated to the output of the encoding block at a level similar to 225 in the first modified U-Net 205 for the second modified U-Net 210. The concatenated features are then provided as inputs to the encoding blocks at the next level of the modified U-Net 210 for segmenting the Gd-enhancing lesions.

II. C. Exemplary Process

Figure 3:
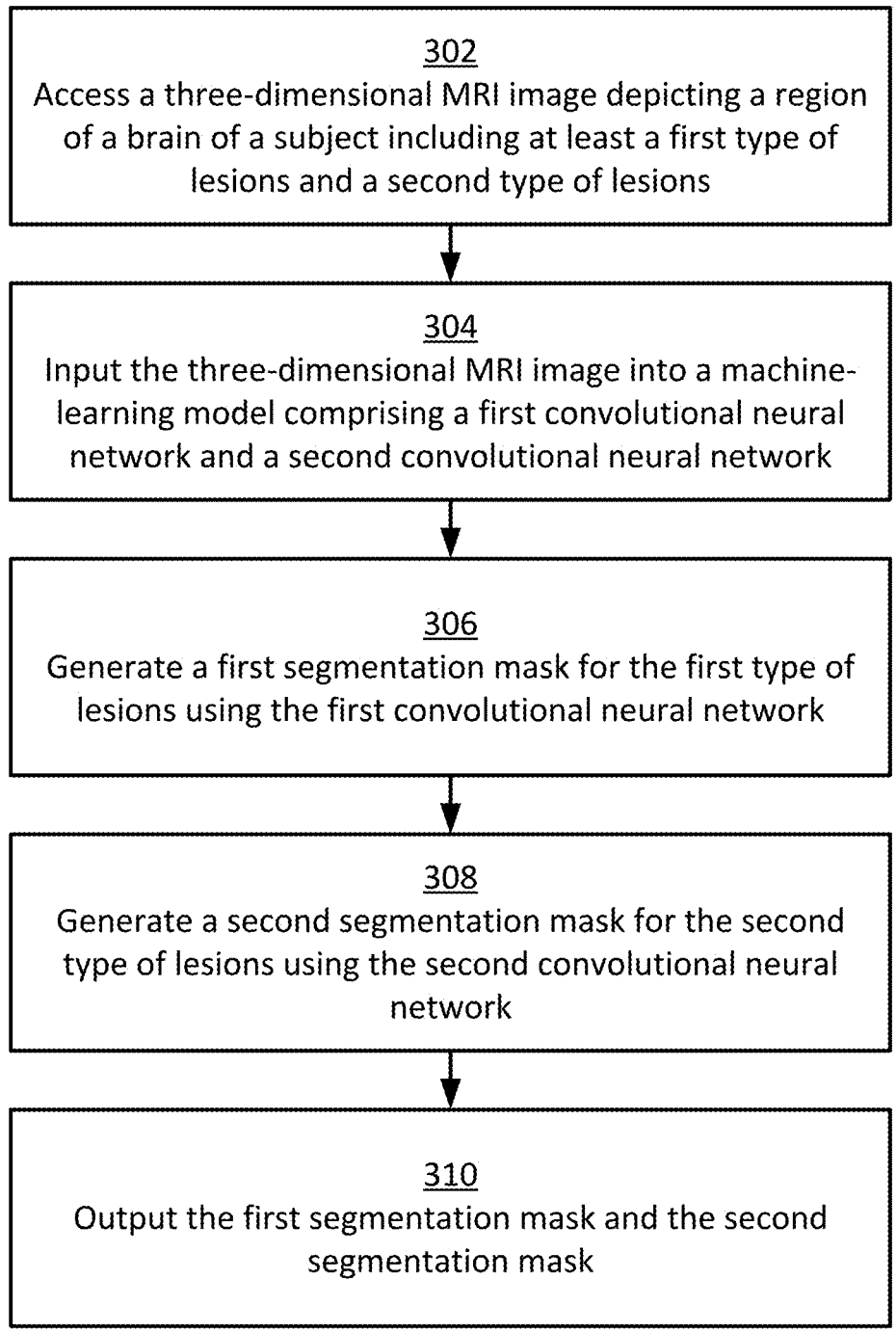
FIG. 3 illustrates an exemplary process environment for segmenting depictions of different types of lesions within images using a model having multiple connected networks according to various embodiments.

FIG. 3 illustrates an exemplary process environment for segmenting depictions of different types of lesions within images using a model having multiple connected networks according to various embodiments. At block 302, a three-dimensional MRI image depicting a brain of a subject is accessed. The brain of the subject includes at least a first type of lesions (e.g., T1 unenhancing lesions) and a second type of lesions (e.g., T1 Gd-enhancing lesions). The three-dimensional MRI image can be accessed by a segmentation controller (e.g., segmentation controller 170) from an imaging system (e.g., imaging system 130).

At block 304, the three-dimensional MRI image is input into a machine-learning model that includes a first convolutional neural network (e.g., the first modified U-Net 205) and that includes a second convolutional neural network (e.g., the second modified U-Net 210). The first convolutional neural network is connected to the second convolutional neural network with one or more cross network connections between one or more layers of the first convolutional neural network and one or more layers of the second convolutional neural network. The cross network connections may be from encoding blocks of the first convolutional neural network to encoding blocks of the second convolutional neural network. Additionally, the cross network connections may be from decoding blocks of the first convolutional neural network to decoding blocks of the second convolutional neural network. Each of the cross network connections can include a feature transformation block and a compression block.

At block 306, a first segmentation mask for the first type of lesions is generated using the first convolutional neural network that takes as input the three-dimensional MRI image. The first segmentation mask includes estimated segmentation boundaries around depictions of the first type of lesions.

At block 308, a second segmentation mask for the second type of lesions is generated using the second convolutional neural network that takes as input the three-dimensional MRI image. The second segmentation mask includes second estimated segmentation boundaries around depictions of the second type of lesions. The first segmentation mask and the second segmentation mask are generated in parallel and a set of extracted features are shared across the one or more cross connection network connections while the first segmentation mask and the second segmentation mask are generated.

At block 310, the first segmentation mask and the second segmentation mask are output. A number of the first type of lesions may be determined using the first segmentation mask and/or a number of the second type of lesions may be determined using the second segmentation mask. One or more lesion sizes or a lesion load may be determined using the first segmentation mask and/or the second segmentation mask. Data corresponding to a previous MRI may be accessed, a change in a quantity, a size or cumulative size of one or more lesions using the first segmentation mask and/or the second segmentation mask and the data may be determined, and an output that represents the change may be generated. A change may be recommended for a treatment strategy based on the first segmentation mask and/or the second segmentation mask. Additionally or alternatively, an output corresponding to a possible or confirmed diagnosis of the subject of multiple sclerosis based at least in part on the first segmentation mask and/or the second segmentation mask may be provided. The subject may be diagnosed with multiple sclerosis based at least in part on the first segmentation mask and/or the second segmentation mask. In some instances, treatment response may be evaluated and/or predicted based at least in part on the first segmentation mask and/or the second segmentation mask.

III. EXAMPLES

The systems and methods implemented in various embodiments may be better understood by referring to the following examples.

III.A Example 1.—Lesion Segmentation

Detecting treatment response on T1 Gd-enhancing lesion burden in clinical trials of multiple sclerosis with deep learning.

IIIA.i. Background

Ocrelizumab (OCR) is a humanized anti-CD20+ monoclonal antibody approved for the treatment of relapsing and primary progressive forms of MS. OCR suppresses the development of new areas of inflammation as shown by the reduction in the number of T1 Gd-enhancing lesions. Deep learning (DL) based segmentation of lesions has the potential to automate these manual reads; enabling faster and more reproducible quantification.

IIIA.ii. Materials and Methods

Lesion segmentation models were developed using MRI datasets of two identical phase III, multicenter, randomized, double-blind, double-dummy, and parallel-group trials in patients with relapsing-remitting multiple sclerosis (RRMS). (Opera 1: NCT01247324, n=898; Opera 2: NCT01412333, n=905). Data was acquired on 1.5T (~0.8%) and 3T (~0.2%) scanners from various manufacturers. Standardized conventional brain MRI including T1w (pre and post contrast), T2w, FLAIR and PD images with ~1×1×3 mm3 resolution was performed at baseline, 24, 48 and 96 weeks. Axial 3 mm T1-weighted slices (3D spoiled gradient echo, repetition time=28-30 ms, echo time=5-11 ms, flip angle=27-30) were acquired pre- and post-Gd injection (0.1 mmol/kg, 10-min post-injection delay). Axial 3 mm T2-weighted slices were acquired with 2D fast spin-echo, repetition time=4000-6190 ms, echo time=74-91 ms and echo train length=7-11. Preprocessing of the MRI data included bias field correction, rigid registration of baseline images to an MNI template, rigid registration of the follow up visits to baseline and skull stripping.

Manual expert annotations gathered as part of the trial were used as ground truth (GT) masks for training the segmentation models. T2 hyperintense lesions were segmented using a semi-automated approach, where an initial automated segmentation was manually corrected by expert neuro radiologists to generate the final T2 lesion masks. The initial segmentation of T1 hypointense/unenhancing lesions included areas within the T2 lesion mask with T1w intensities lower than a majority of voxels in white matter and did not show Gd-enhancement on the post-contrast scan. This initial mask was then manually corrected by expert readers to create the final T1 unenhancing lesion masks. Gd-enhancing lesions were segmented manually. Contrast enhancement here is defined as an increase in intensity by at least 20% on the post-contrast scans and a minimum size threshold of 3 voxels was used for both unenhancing and enhancing lesions. New T1 unenhancing lesions were identified based on differences in lesion segmentations at reference and follow-up time points and were subsequently reviewed by expert readers to correct for spurious difference due to segmentation variability and possible mis-registration.

IIIA.iii. Network Architecture

The network architecture of the model is shown and described herein with respect to FIG. 2. In general, the model comprised a first modified U-Net used to segment unenhancing lesions and a second modified U-Net used to segment Gd-enhancing lesions. The first modified U-Net is connected to the second modified U-Net with multiple cross network connections from encoding blocks of the first modified U-Net to encoding blocks of the second modified U-Net. Each cross network connection comprises a feature transformation block and a compression block.

IIIA.iv. Network Training and Subsequent Inference

Images from Opera I trial were used to jointly train the networks and a 70%-30% data split was used for training and validation. The networks were tested on images from Opera II trials.

The FLAIR images were intensity rescaled and z-scored. To capture the increase in intensity of the lesions in T1w post contrast images with respect to the pre-contrast images, these volumes were jointly normalized, i.e., rescaled maintaining the intensity relationship between the volumes and both volumes were z-scored using the mean and standard deviation of brain in pre-contrast scans. The models were trained with three contiguous slices from FLAIR, T1w pre and post contrast images, which were stacked along the channel dimension to be used as input for both the networks in the individual configuration. For the joint configuration, the second network for segmenting T1 Gd-enhancing lesions receives only the T1w pre and post contrast images and FLAIR related information is mainly conveyed along the cross-network connections. For a given input shape of 256×256×60, 58 stacks of three slices were created using a sliding window approach. Only the stacks that contained any lesion (unenhancing or Gd-enhancing) were retained in the training and validation sets. The networks parameters were optimized using Adam optimizer (initial learning rate of 1e-4, ($\beta_1$=0.9, ($\beta_2$=0.999) for 50 epochs and at a batch size of 6.

Due to the better performance of asymmetric loss functions and potential advantages achieved from a combinatorial loss function for segmenting lesions in MS, a combination of Tversky loss (see Equation (1)) and weighted binary cross entropy (wBCE) loss (see Equation (2)) was created for training the individual networks. The hyperparameters a and p were fine-tuned in the experiments using Equation (3). For joint training, in addition to the losses for the two networks, penalty terms were added for any overlap of the two lesion types and contribution of false positives from both networks using Equation (4).

For inference, the multi modal input was handled the same as during training; the 3D volumes were split into stacks of three slices and model predictions were obtained for all stacks. For every slice, three predictions were obtained by virtue of the same slice being part of three neighboring stacks as top, bottom and middle slices. The predicted probabilities were thresholded at 0.5 and the three predictions were combined using majority voting. This helped to reduce false positives and slices towards the ends were handled differently. The models were implemented in Python using Keras in TensorFlow.

As a significant proportion of the false positives for Gd-enhancing lesions were from blood vessels, vessel tracking was performed to reduce false positives. Region growing was used on voxels having intensity in the top third percentile (>=97th) of voxels within the brain in T1 post contrast images. The largest vessel tree and enhancement along the boundaries of the brain were retained. Any lesion that overlapped the vessel tree by more than 30% was removed.

IIIA.v. Evaluation

The models were evaluated for their segmentation performance at the per voxel level and detection performance at the lesion level. Mean Dice Coefficient (DC), positive predictive value (PPV), Sensitivity, absolute volume difference (AVD) and Pearson's correlation coefficient of the predicted and GT volumes were used as metrics for evaluating the segmentation performance. DC is a metric for measuring the overlap of the predicted and ground truth binary masks and is defined by Equation (5) as:

$$DC = \frac{2*TP}{2*TP + FN + FP} \quad \text{Equation (5)}$$

TP are the true positives corresponding to the overlap of model predictions and ground truth masks, FP are the false positives, and FN are the false negatives. DC values range from zero to one, with zero indicating no overlap and one indicating a perfect overlap. In addition to the overall mean DC, the mean DC for volumes with low, medium, and high total lesion loads were evaluated.

PPV, or precision, is the ratio of voxel wise TPs to the sum of TPs and FPs and is a measure of the proportion of voxels predicted correctly by the model, as shown in Equation (6).

$$PPV = \frac{TP}{TP + FP} \quad \text{Equation (6)}$$

Sensitivity, or recall, is the ratio of TP to the sum of TPs and FNs and is the percentage of ground truth voxels segmented correctly by the model, as shown in Equation (7):

$$\text{Sensitivity} = \frac{TP}{TP + FN} \quad \text{Equation (7)}$$

AVD is the fraction of the absolute difference in the predicted and ground truth volumes with respect to the ground truth volume. It gives a measure of over or under-segmentation by the model relative to ground truth volume, as shown in Equation (8):

$$AVD = \frac{|vol_p - vol_g|}{vol_g} \quad \text{Equation (8)}$$

Individual lesions were identified as connected components (with an 18-connectivity kernel) in the ground truth and predicted masks. For a detected lesion to be considered a true lesion, it has a minimum size of three voxels and overlaps with the ground truth by at least 10%. For evaluating the lesion detection performance, lesion PPV (LPPV), lesion true positive rate (LTPR), lesion false positive rate (LFPR), and Pearson's correlation coefficient of the number of lesions predicted by the models and number of lesions in the ground truth masks were used as evaluation metrics. A high value is desired for all the detection metrics except LFPR, which is a measure of the percentage of FP lesions among the lesions predicted by the model.

IIIA.vi. Reproducing Imaging Endpoints

For conducting experiments to reproduce imaging endpoints, comparison of model predicted masks with manual neuro radiologist reads were performed on Opera 2 images only (as images from Opera 1 were used for training the models). Statistical analysis was performed using R (R version 4.0.1, R Foundation for Statistical Computing).

To examine if the trained model could reproduce known T1 Gd-enhancing endpoints, the mean number of Gd-enhancing lesions and a percent reduction of average number of lesions in the treatment (Ocrelizumab) were estimated in comparison to the control (Interferon β) arm at 24, 48 and 96 weeks. Similar to known analysis methodologies in determining T1 Gd-enhancing endpoints, a negative binomial regression was performed of the number of Gd-enhancing lesions with treatment arm, baseline T1 Gd-enhancing lesion (present or not), baseline Expanded Disability Status Scale score (<4.0 vs ≥4.0), and geographical region (US vs rest of the world) as independent variables.

An automated heuristic approach was developed based on morphological operations for estimating the number of new T1 unenhancing lesions from GT serial lesion masks to closely approximate values reported in the original analysis from neuro radiologist reads. This approach was then applied to model predicted masks and the mean number of new T1 unenhancing lesions across all follow-up time points and the percent reduction in the Ocrelizumab arm when compared to the control arm was estimated. As in known analysis methodologies, a negative binomial regression was performed on the number of new T1 unenhancing lesions with treatment arm, baseline T1 hypointense lesion count, baseline EDSS (<4.0 vs ≥4.0) and geographic region (US vs rest of the world) as independent variables.

Figure 4:
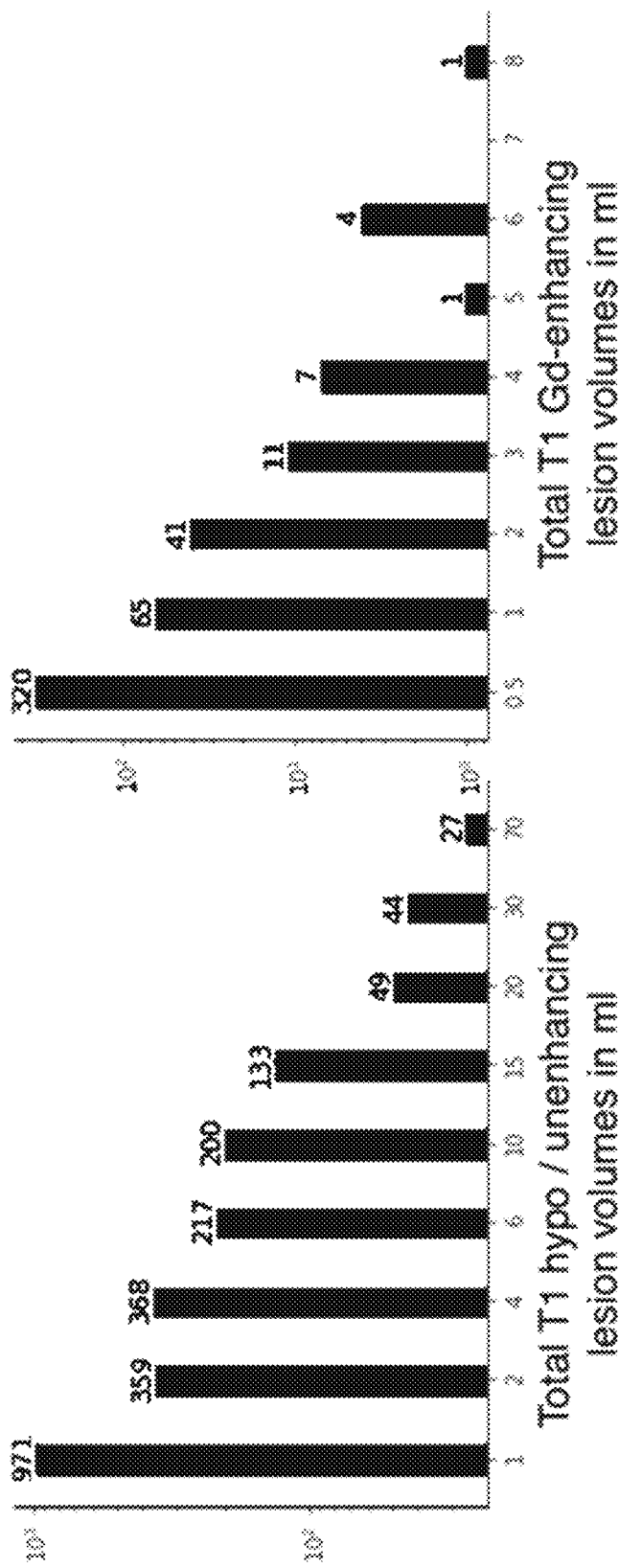
FIG. 4 shows exemplary histograms of total T1 unenhancing lesion volumes and total T1 gadolinium (Gd)-enhancing lesion volumes for a data set.

FIG. 4 shows total T1 unenhancing lesion volumes in ml and total T1 Gd-enhancing lesion volumes in ml for the Opera 2 data set. Only a subset of the subjects had Gd-enhancing lesions and the T1 Gd-enhancing lesions were typically smaller than the T1 unenhancing lesions. According to the GT masks from neuro-radiologist reads, T1 Gd-enhancing lesions were present in approximately 40% of patients at baseline and approximately 16-18% of volumes across all time points (baseline, 24 weeks, 48 weeks, and 96 weeks). The lesion loads were heavily skewed towards smaller sizes. T1 unenhancing lesion loads ranged from 0.012 ml to 68.86 ml with a median of 1.56 ml and T1 Gd-enhancing lesion loads ranged from 0.012 ml to 7.47 ml with a median of 0.213 ml. 71% of volumes had a maximum Gd-enhancing lesion load of 0.5 ml and 72% of volumes had a maximum T1 unenhancing lesion load of 4 ml.

The segmentation performance of separately and jointly trained models for both lesion types on the test set is summarized in Table 1. Both networks had good agreement between manual annotations in GT and model predicted masks as seen by the mean dice coefficient (DC) and Pearson's correlation between GT and model predicted total lesion loads. Broadly, the individually trained models had marginally better sensitivities (0.74 vs 0.7 for T1 unenhancing and 0.78 vs 0.69 for Gd-enhancing lesions) than jointly trained models; jointly trained models improved the DC (0.72 vs 0.73, 0.72 vs 0.75), positive predictive value (PPV; 0.74 vs 0.8, 0.71 vs 0.87) and absolute volume difference (AVD; 0.29 vs 0.26, 0.69 vs 0.31). The final mean DC was 0.78 for Gd-enhancing lesion segmentation with ~23% of lesions being voxels in size. (compared to [1] I. Coronado, R. E. Gabr and a. P. A. Narayana, "Deep learning segmentation of gadoliniumenhancing lesions in multiple sclerosis," *Multiple Sclerosis Journal*, no. May, 2020 and [2] G. Brugnara, F. Isensee, U. Neuberger, D. Bonekamp, J. Petersen, R. Diem, B. Wildemann, S. Heiland, W. Wick, M. Bendszus, K. Maier-Hein and P. Kickingereder, "Automated volumetric assessment with artificial neural networks might enable a more accurate assessment of disease burden in patients with multiple sclerosis," *European Radiology*, vol. 30, no. 4, pp. 2356-64, 2020, where they achieved a DC of 0.77 and 0.91 respectively for Gd-enhancing lesion segmentation. In [2] all lesions smaller than 14 mm$^3$/voxels were excluded, this could possibly explain the high DC here.)

Figure 5:
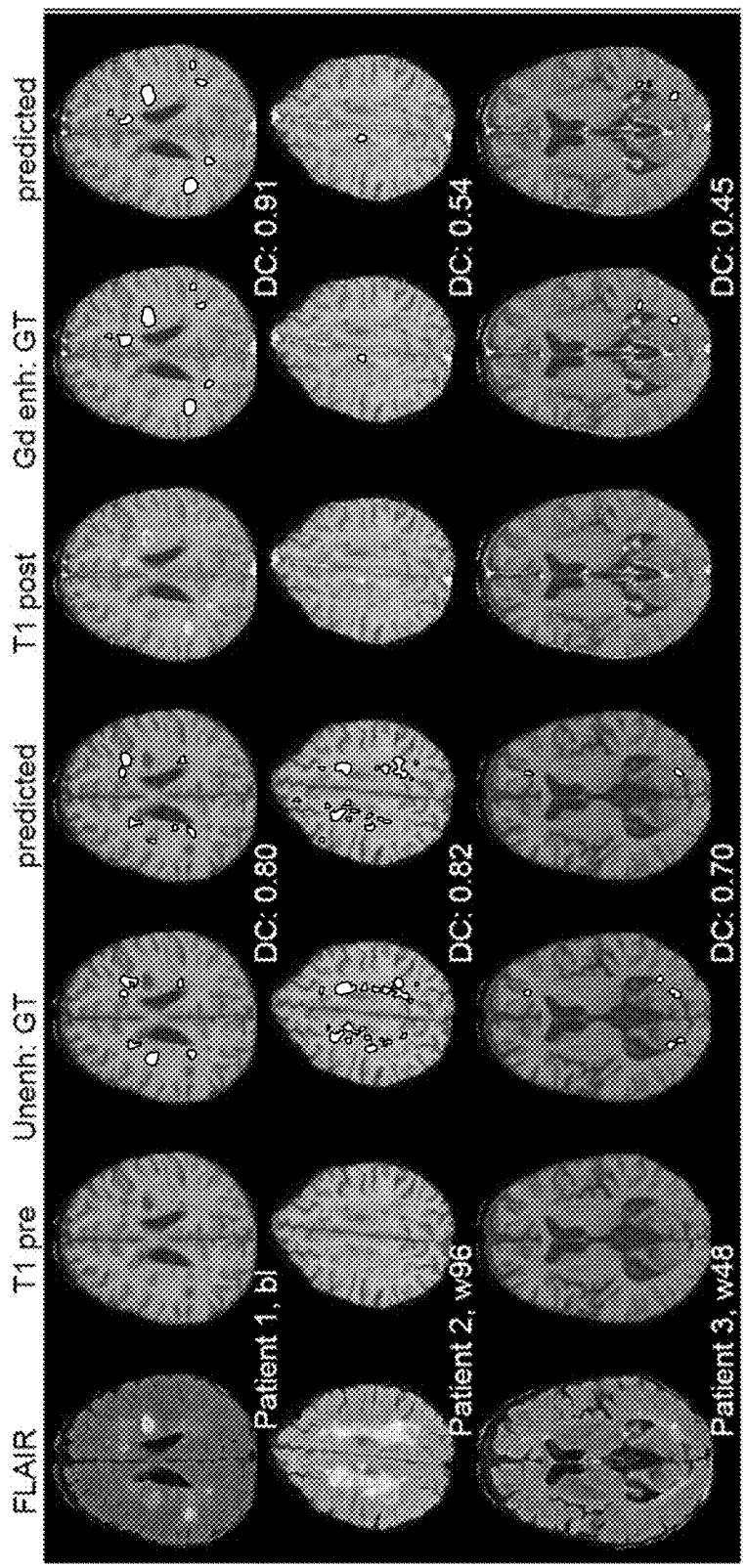
FIG. 5 shows exemplary predicted lesion segmentation from the models compared with ground truths for magnetic resonance imaging (MRI) images of a section of a brain for three subjects.

FIG. 5 shows predicted lesion segmentation from the models compared with GTs for an MRI images of a section of a brain for three subjects. The overlap of the GT with the predicted T1 unenhancing and Gd-enhancing lesions suggests the models accurately predicts lesion size and location in MRI images.

In addition, detection performance for various lesion size buckets for Gd-enhancing lesions was investigated (Table 3). The results include calculations of GT lesion counts, TP values, sensitivity, FP values (the numbers in parenthesis correspond to the number of FP lesions in datasets which did not contain any Gd-enhancing lesions in the GT annotations), false discovery rates (FDR), and dice values. False Discovery Rate (FDR), also called FPR is high for lesions smaller than 0.03 ml (or 10 voxels) and decreased considerably as the lesion size increased. DC also exhibited an analogous trend with increasing lesion sizes. Based on this analysis, a detection threshold of 0.03 ml would be preferred

TABLE 1

Segmentation performance (for AVD, std. dev is calculated excluding the top 1% outliers). Gd-enhancing lesion performance is reported on the subset of volumes which have lesions in GT annotations.

|  | Models | Dice (mean ± std) | PPV (mean ± std) | sensitivity | AVD | Volume corr |
|---|---|---|---|---|---|---|
| unenh | Individual | 0.722 ± 0.152 | 0.737 ± 0.173 | 0.739 ± 0.176 | 0.289 ± 0.281 | 0.975 |
|  | Joint | 0.729 ± 0.157 | 0.797 ± 0.163 | 0.698 ± 0.184 | 0.261 ± 0.202 | 0.976 |
| enh | Individual | 0.716 ± 0.204 | 0.713 ± 0.25 | 0.778 ± 0.187 | 0.69 ± 1.107 | 0.96 |
|  | Joint | 0.745 ± 0.194 | 0.871 ± 0.162 | 0.691 ± 0.223 | 0.308 ± 0.242 | 0.97 |
| FP$_{enh}$ redn | Joint | 0.778 ± 0.142 | 0.888 ± 0.143 | 0.718 ± 0.18 | 0.269 ± 0.182 | 0.97 |

The detection performance of the models on the test set is summarized in Table 2. Both models showed similar trends in detection performance, with individually trained models having marginally better lesion true positive rates (LTPR; 0.83 vs 0.79, 0.96 vs 0.91) and jointly trained models having better LPPV (0.89 vs 0.92, 0.76 vs 0.93) and lesion false positive rates (LFPR; 0.17 vs 0.13, 0.25 vs 0.06). There was a good agreement between lesion counts from GT and model predicted masks for the various models as seen by the high Pearson's correlation coefficients. Joint training immensely helped to reduce over-segmentation and FPs for Gd-enhancing lesion segmentation. This was further improved after FP reduction using vessel tracking, which reduced erroneous predictions in volumes that did not contain any Gd-enhancing lesions according to manual GT annotations.

for striking a balance between high FDR and low sensitivity. However, this will also eliminate 23% of lesions. (The performance is comparable to that reported in Table III of [3] Z. Karimaghaloo, H. Rivaz, D. L. Arnold, D. L. Collins and T. Arbel, "Temporal Hierarchical Adaptive Texture CRF for Automatic Detection of Gadolinium-Enhancing Multiple Sclerosis Lesions in Brain MRI," *IEEE Transactions on Medical Imaging*, vol. 34, no. 6, pp. 1227-1241, 2015, except for the smallest lesion size bucket. The present example did not use longitudinal information and have a larger training set (8×) compared to [3]. It is also comparable with Table 2 of [1], though the lesion size buckets are different).

TABLE 2

Detection performance for Gd-enhancing lesions. Gd-enhancing lesion performance is reported on the subset of volumes which had lesions in GT annotations.

|  | Models | PPV | LTPR | LFPR | Count corr |
|---|---|---|---|---|---|
| unenh | Individual | 0.888 ± 0.159 | 0.826 ± 0.156 | 0.169 ± 0.168 | 0.972 |
|  | Joint | 0.918 ± 0.142 | 0.792 ± 0.169 | 0.128 ± 0.154 | 0.971 |
| enh | Individual | 0.756 ± 0.271 | 0.957 ± 0.146 | 0.245 ± 0.27 | 0.972 |
|  | Joint | 0.927 ± 0.173 | 0.906 ± 0.217 | 0.06 ± 0.156 | 0.978 |
| FP$_{enh}$ redn | Joint | 0.943 ± 0.151 | 0.921 ± 0.164 | 0.04 ± 0.131 | 0.979 |

TABLE 3

Gd-enhancing lesion detection performance for different lesion sizes.
Total FP lesion counts in volumes with and without (within parenthesis)
Gd-enhancing lesions in GT annotations are provided.

|  | Overall | <0.015 ml (5 vox) | 0.015-0.03 ml (5-10 vox) | 0.03-0.06 ml (10-20 vox) | 0.06-0.15 ml (20-50 vox) | 0.15-0.3 ml (50-100 vox) | 0.3-0.75 ml (100-250 vox) | >0.75 ml |
|---|---|---|---|---|---|---|---|---|
| GT | 1838 | 74 | 350 | 478 | 557 | 230 | 113 | 36 |
| TP | 1568 | 28 | 222 | 406 | 538 | 227 | 111 | 36 |
| Sensitivity | 0.853 | 0.38 | 0.63 | 0.85 | 0.97 | 0.99 | 0.99 | 1 |
| FP | 73 (87) | 31 (23) | 29 (25) | 9 (23) | 3 (14) | 1 (1) | 0 (1) | 0 |
| FDR | 0.09 | 0.658 | 0.196 | 0.073 | 0.03 | 0.009 | 0.001 | 0 |
| Dice | 0.671 | 0.311 | 0.499 | 0.681 | 0.773 | 0.82 | 0.84 | 0.776 |

Detection performance of T1 unenhancing lesions segmentation model for various lesion sizes is given in Table 4 and for both individually and jointly trained models for Gd-enhancing lesion segmentation in Table 5.

TABLE 4

T1 unenhancing lesion detection performance for different lesion sizes

| Lesion size | Individual | | | | | | Joint | | | | |
|---|---|---|---|---|---|---|---|---|---|---|---|
|  | GT | TP | sens | FP | FDR | Dice | TP | sens | FP | FDR | Dice |
| <0.03 (10) | 31700 | 17533 | 0.555 | 6688 | 0.28 | 0.404 | 15593 | 0.492 | 4667 | 0.23 | 0.376 |
| 0.03-0.15 (50) | 28563 | 25204 | 0.88 | 1801 | 0.07 | 0.681 | 24515 | 0.858 | 1254 | 0.05 | 0.673 |
| 0.15-0.3 (100) | 4901 | 4762 | 0.97 | 73 | 0.015 | 0.782 | 4713 | 0.962 | 54 | 0.011 | 0.785 |
| 0.3-1.5 (500) | 3856 | 3822 | 0.99 | 25 | 0.006 | 0.831 | 3820 | 0.991 | 17 | 0.004 | 0.841 |
| >1.5 | 723 | 723 | 1 | 1 | 0.001 | 0.879 | 723 | 1 | 1 | 0.001 | 0.886 |

TABLE 5

T1 Gd-enhancing lesion detection performance for different lesion sizes.
Total FP lesion counts in datasets with and without (within parenthesis)
Gd-enhancing lesions in GT annotations are provided.

| Lesion size | Individual | | | | | | Joint | | | | |
|---|---|---|---|---|---|---|---|---|---|---|---|
|  | GT | TP | sens | FP | FDR | Dice | TP | sens | FP | FDR | Dice |
| <0.015 (5) | 74 | 42 | 0.57 | 108 (313) | 0.91 | 0.493 | 28 | 0.38 | 31 (34) | 0.7 | 0.311 |
| 0.015-0.03 (10) | 350 | 281 | 0.80 | 161 (419) | 0.67 | 0.632 | 222 | 0.63 | 36 (57) | 0.29 | 0.499 |
| 0.03-0.06 (20) | 478 | 446 | 0.93 | 91 (356) | 0.5 | 0.725 | 406 | 0.85 | 14 (59) | 0.15 | 0.681 |
| 0.06-0.15 (50) | 557 | 548 | 0.98 | 74 (360) | 0.44 | 0.798 | 539 | 0.97 | 11 (65) | 0.12 | 0.773 |
| 0.15-0.3 (100) | 230 | 229 | 0.99 | 26 (190) | 0.48 | 0.836 | 227 | 0.99 | 3 (15) | 0.07 | 0.82 |
| 0.3-0.75 (250) | 113 | 113 | 1 | 13 (71) | 0.44 | 0.863 | 111 | 0.99 | 1 (3) | 0.03 | 0.84 |
| >0.75 | 36 | 36 | 1 | 1 (9) | 0.21 | 0.836 | 36 | 1 | 0 | 0 | 0.776 |

III.B Example 2.—Lesion Changes Across Treatments

Detecting treatment response on T1 Gd-enhancing lesion burden in clinical trials of multiple sclerosis with deep learning.

III.B.i. Discussion

Lesions are frequently evaluated during clinical studies to predict whether a given therapeutic is effective at treating multiple sclerosis so as to slow progression of the disease. In particular, study endpoints frequently examine an extent to which a lesion count and/or lesion size (e.g., cumulative lesion size) changed during a study period. The change observed when a particular treatment was administered during the study period can be compared to a corresponding change observed when no treatment or a baseline treatment was administered during the study period.

Data for this example compares the change in T1 unenhancing lesion counts when Ocrelizumab was administered as compared to interferon-beta. Jointly trained models were used to process T1 unenhancing and T1 Gd-enhancing images collected subsequent to contrast-agent administration. Each model was trained using the Opera 1 data set and tested using the Opera 2 data set. For each subject and imaging session, the evaluated model prediction was the number of T1 Gd-enhancing lesions. MRIs were performed at 24 weeks, 48 weeks, and 96 weeks from treatment administration. For each treatment group, the number of lesions at follow-up time points divided by the number of MRI scans at the time points was calculated.

Figure 6A:
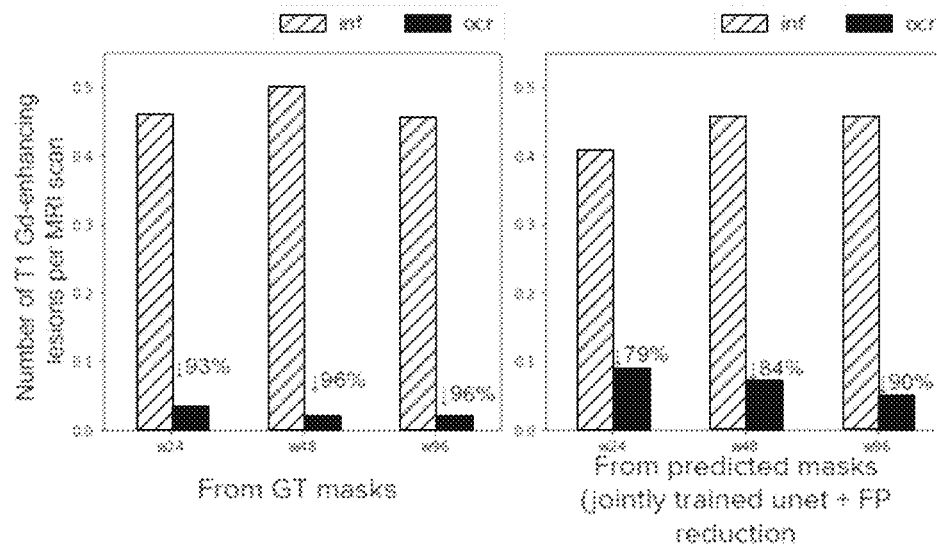
FIG. 6A shows exemplary results for T1 Gd-enhancing lesion counts for two treatment groups at each of the three time points.

As shown in FIG. 6A, the clinical data showed that T1 Gd-enhancing lesion counts were significantly different between the two treatment groups at each of the three time points. For the GT masks, the follow up time point reductions were 93%, 96%, and 96% at 24, 48, and 96 weeks respectively. Using the model predictions, at individual follow up time points the reductions were 79%, 84%, and 90% at 24, 48, and 96 weeks respectively.

Figure 6B:
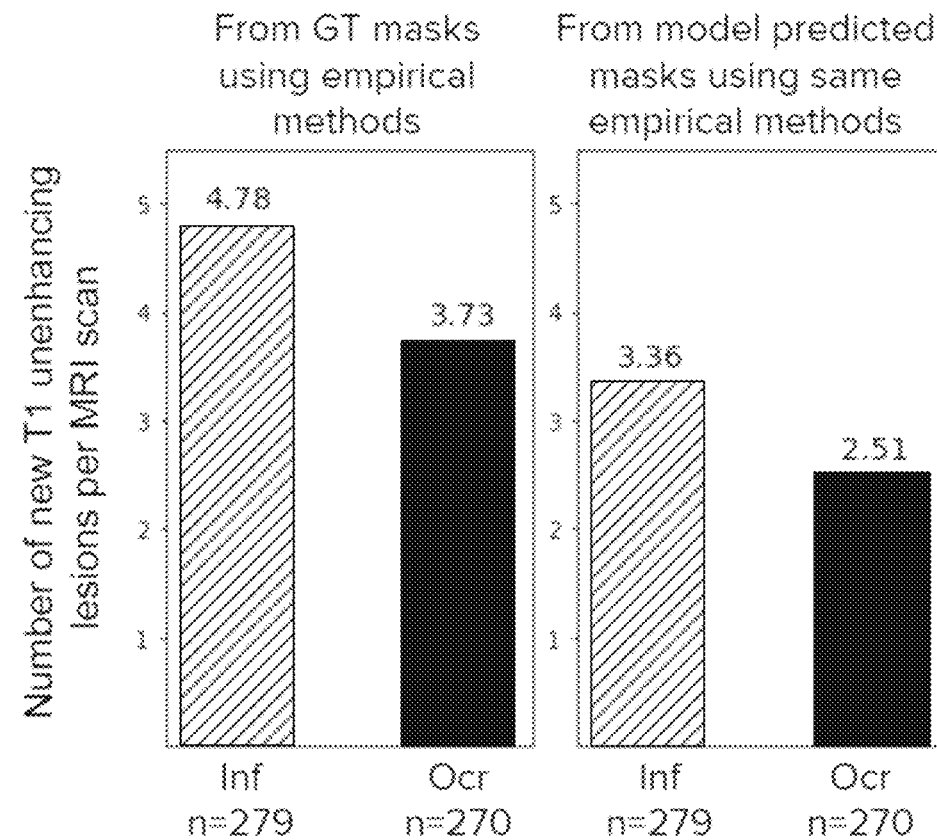
FIG. 6B shows exemplary results for T1 unenhancing lesion counts from ground truth masks using an empirical approach and model predicted masks using the same empirical approach.

FIG. 6B shows results for T1 unenhancing lesion counts from GT masks using an empirical approach and model predicted masks using the same empirical approach. Using the empirical approach on GT masks, the reduction was 22% from 4.78 in the control arm to 3.73 in the Ocrelizumab arm. The model tended to predict fewer lesions than those in GT masks using the empirical approach. Based on model predictions, the number of new T1 unenhancing lesions was 3.36 in the control arm and 2.51 in the treatment arm. Additionally, the number of new T1 unenhancing lesions was significantly different across the arms in a negative binomial regression with additional baseline imaging and clinical covariates. There was an approximately 22% reduction in the mean number of new T1 unenhancing lesions between the treatment and control arms from the GT masks. When using model predictions, the percent reduction was ~25%, which is comparable to the reduction from GT masks. However, the original manual analysis had a percent reduction of ~60%, hence the empirical approach used to identify new T1 unenhancing lesions needs improvement.

IV. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

V. EXAMPLE EMBODIMENTS

As used below, any reference to a series of examples is to be understood as a reference to each of those examples disjunctively (e.g., "Examples 1-4" is to be understood as "Examples 1, 2, 3, or 4").

Example 1 is a computer-implemented method comprising: accessing a three-dimensional magnetic resonance imaging (MRI) image, wherein the three-dimensional MRI image depicts a region of a brain of a subject, wherein the region of the brain includes at least a first type of lesions and a second type of lesions; inputting the three-dimensional MRI image into a machine-learning model comprising a first convolutional neural network and a second convolutional neural network, wherein the first convolutional neural network is connected to the second convolutional neural network with one or more cross network connections between one or more layers of the first convolutional neural network and one or more layers of the second convolutional neural network; generating a first segmentation mask for the first type of lesions, using the first convolutional neural network that takes as input the three-dimensional MRI image, wherein the first segmentation mask comprises first estimated segmentation boundaries around depictions of the first type of lesions; generating a second segmentation mask for the second type of lesions, using the second convolutional neural network that takes as input the three-dimensional MRI image, wherein the second segmentation mask comprises second estimated segmentation boundaries around depictions of the second type of lesions, and wherein the first segmentation mask and the second segmentation mask are generated in parallel and a set of extracted features are shared across the one or more cross network connections while the first segmentation mask and the second segmentation mask are generated; and outputting the first segmentation mask and the second segmentation mask.

Example 2 is the computer-implemented method of example 1, wherein the first convolutional neural network is connected to the second convolutional neural network with the one or more cross network connections from encoding blocks of the first convolutional neural network to encoding blocks of the second convolutional neural network.

Example 3 is the computer-implemented method of example(s) 1 or 2, wherein the first convolutional neural network is connected to the second convolutional neural network with the one or more cross network connections from decoding blocks of the first convolutional neural network to decoding blocks of the second convolutional neural network Example 4 is the computer-implemented method of example(s) 1-3, wherein each of the cross network connections comprises a feature transformation block and a compression block.

Example 5 is the computer-implemented method of any of example(s) 1-4, further comprising: generating a final image mask by combining information from the first segmentation mask and the second segmentation mask, wherein the final image mask comprises estimated segmentation boundaries around depictions of a new set of lesions that are representative of a combination of the first type of lesions and the second type of lesions; and outputting the final image mask.

Example 6 is the computer-implemented method of any of example(s) 1-5, wherein the first type of lesions are T1 unenhancing lesion and the second type of lesions are T1 Gd-enhancing lesions.

Example 7 is the computer-implemented method of any of example(s) 1-6, wherein the first convolutional neural network and the second convolutional neural network were trained using a loss function comprising a combination of a Tversky loss and a weighted binary cross entropy loss.

Example 8 is the computer-implemented method of example(s) 1-7, wherein the first convolutional neural network comprises a plurality of model parameters identified using a set of training data comprising: a plurality of medical images with annotations associated with segmentation boundaries around different types of lesions including the first type of lesions and the second type of lesions; and wherein the plurality of model parameters are identified using the set of training data based on minimizing the loss function.

Example 9 is the computer-implemented method of example(s) 1-8, wherein the second convolutional neural network comprises a plurality of model parameters identified using the set of training data; and wherein the second convolutional neural network is trained jointly with the first convolutional neural network such that the plurality of model parameters of the second convolutional neural network are cooperatively identified using the set of training data based on minimizing the loss function.

Example 10 is the computer-implemented method of example(s) 1-9, wherein loss function further comprises penalty terms for any overlap between the first type of lesions and the second type of lesions and contribution of false positives from the first convolutional neural network and the second convolutional neural network.

Example 11 is the computer-implemented method of any of example(s) 1-10, wherein the first convolutional neural network and the second convolutional neural network are U-Nets.

Example 12 is the computer-implemented method of example(s) 1-11, wherein the first convolutional neural network comprises three layers of encoding blocks and decoding blocks.

Example 13 is the computer-implemented method of example(s) 1-12, wherein the second convolutional neural network comprises three layers of encoding blocks and decoding blocks.

Example 14 is the computer-implemented method of any of example(s) 1-13, wherein the three-dimensional MRI image comprises multiple contiguous slices stacked along a channel dimension, wherein the contiguous slices comprise a first three-dimensional MRI slice generated using a first type of MRI sequence, a second three-dimensional MRI slice generated using a second type of MRI sequence, and a third three-dimensional MRI slice generated using a third type of MRI sequence.

Example 15 is the computer-implemented method of example(s) 1-14, wherein the first type of MRI sequence is T1 post-contrast, the second type of MRI sequence is T1 pre-contrast, and the third type of MRI sequence is fluid-attenuated inversion recovery.

Example 16 is the computer-implemented method of example(s) 1-15, wherein the first three-dimensional MRI slice and the second three-dimensional MRI slice are normalized to capture contrast enhancement, where the normalization comprises using a mean and standard deviation of the second three-dimensional MRI slice to z-score both a first three-dimensional MRI slice volume and a second three-dimensional slice volume.

Example 17 is the computer-implemented method of any of example(s) 1-16, further comprising: determining a count of a number of the first type of lesions using the first segmentation mask and a count of a number of the second type of lesions using the second segmentation mask.

Example 18 is the computer-implemented method of example(s) 1-17, further comprising: determining a count of a number of the first type of lesions using the first segmentation mask, a count of a number of the second type of lesions using the second segmentation mask, and/or a count of a number of lesion within the new set of lesions using the final image mask.

Example 19 is the computer-implemented method of any of example(s) 1-18, further comprising: determining one or more lesion sizes or a lesion load using the first segmentation mask, the second segmentation mask, and/or the final image mask.

Example 20 is the computer-implemented method of any of example(s) 1-19, further comprising: accessing data corresponding to a previous MRI; determining a change in a quantity, a size or cumulative size of one or more lesions using the first segmentation mask, the second segmentation mask, and/or the final image mask and the data; and generating an output that represents the change.

Example 21 is the computer-implemented method of any of example(s) 1-20, further comprising: recommending changing a treatment strategy based on the first segmentation mask, the second segmentation mask, and/or the final image mask.

Example 22 is the method of any of example(s) 1-21, further comprising: providing an output corresponding to a possible or confirmed diagnosis of the subject of multiple sclerosis based at least in part on the first segmentation mask, the second segmentation mask, and/or the final image mask.

Example 23 is the method of any of example(s) 1-22, further comprising: diagnosing the subject with multiple sclerosis based at least in part on the first segmentation mask, the second segmentation mask, and/or the final image mask.

Example 24 is the method of any of example(s) 1-23, further comprising: evaluating and/or predicting treatment response based at least in part on the first segmentation mask, the second segmentation mask, and/or the final image mask.

Example 25 is a computer-implemented method comprising: accessing a three-dimensional magnetic resonance imaging (MRI) image, wherein the three-dimensional MRI image depicts a region of a brain of a subject, wherein the region of the brain includes at least a first type of lesion and a second type of lesion; inputting the three-dimensional MRI image into a machine-learning model comprising a first convolutional neural network connected to a second convolutional neural network; generating a first segmentation mask for the first type of lesion, using the first convolutional neural network that takes as input the three-dimensional MRI image; generating a second segmentation mask for the second type of lesion, using the second convolutional neural network that takes as input the first segmentation mask on the three-dimensional MRI image; generating a final image mask by combining information from the first segmentation mask and the second segmentation mask, wherein the final image mask comprises a first estimated segmentation boundary around depictions of the first type of lesion and/or a second estimated segmentation boundary around depictions of the second type of lesion; and outputting the final image mask.

Example 26 is a system comprising: one or more data processors; and a non-transitory computer readable storage medium containing instructions which, when executed on the one or more data processors, cause the one or more data processors to perform part or all of one or more methods disclosed herein.

Example 27 is a computer-program product tangibly embodied in a non-transitory machine-readable storage medium, including instructions configured to cause one or more data processors to perform part or all of one or more methods disclosed herein.

What is claimed:

1. A computer-implemented method comprising:
accessing a three-dimensional magnetic resonance imaging (MRI) image, wherein the three-dimensional MRI image depicts a region of a brain of a subject, wherein the region of the brain includes at least a first type of lesions and a second type of lesions;
inputting the three-dimensional MRI image into a machine-learning model comprising a first convolutional neural network and a second convolutional neural network, wherein the first convolutional neural network is connected to the second convolutional neural network with one or more cross network connections between one or more layers of the first convolutional neural network and one or more layers of the second convolutional neural network;
generating a first segmentation mask for the first type of lesions, using the first convolutional neural network that takes as input the three-dimensional MRI image, wherein the first segmentation mask comprises first estimated segmentation boundaries around depictions of the first type of lesions;
generating a second segmentation mask for the second type of lesions, using the second convolutional neural network that takes as input the three-dimensional MRI image, wherein the second segmentation mask comprises second estimated segmentation boundaries around depictions of the second type of lesions, and wherein the first segmentation mask and the second segmentation mask are generated in parallel and a set of extracted features are shared across the one or more cross network connections while the first segmentation mask and the second segmentation mask are generated; and
outputting the first segmentation mask and the second segmentation mask.

2. The computer-implemented method of claim 1, wherein the first convolutional neural network is connected to the second convolutional neural network with the one or more cross network connections from encoding blocks of the first convolutional neural network to encoding blocks of the second convolutional neural network.

3. The computer-implemented method of claim 1, wherein the first convolutional neural network is connected to the second convolutional neural network with the one or more cross network connections from decoding blocks of the first convolutional neural network to decoding blocks of the second convolutional neural network.

4. The computer-implemented method of claim 1, wherein each of the cross network connections comprises a feature transformation block and a compression block.

5. The computer-implemented method of claim 1, further comprising:
generating a final image mask by combining information from the first segmentation mask and the second segmentation mask, wherein the final image mask comprises estimated segmentation boundaries around depictions of a new set of lesions that are representative of a combination of the first type of lesions and the second type of lesions; and
outputting the final image mask.

6. The computer-implemented method of claim 5, further comprising:
determining a count of a number of the first type of lesions using the first segmentation mask, a count of a number of the second type of lesions using the second segmentation mask, a count of a number of lesion within the new set of lesions using the final image mask, and/or one or more lesion sizes or a lesion load using the first segmentation mask, the second segmentation mask, and/or the final image mask.

7. The computer-implemented method of claim 1, wherein the first type of lesions is a T1 unenhancing lesion type and the second type of lesions is a T1 Gd-enhancing lesion type.

8. The computer-implemented method of claim 1, wherein the first convolutional neural network and the second convolutional neural network were trained using a loss function comprising a combination of a Tversky loss and a weighted binary cross entropy loss.

9. The computer-implemented method of claim 8, wherein the first convolutional neural network comprises a plurality of model parameters identified using a set of training data comprising: a plurality of medical images with annotations associated with segmentation boundaries around different types of lesions including the first type of lesions and the second type of lesions; and wherein the plurality of model parameters are identified using the set of training data based on minimizing the loss function.

10. The computer-implemented method of claim 9, wherein the second convolutional neural network comprises a plurality of model parameters identified using the set of training data; wherein the second convolutional neural network is trained jointly with the first convolutional neural network such that the plurality of model parameters of the second convolutional neural network are cooperatively identified using the set of training data based on minimizing the loss function; and wherein the loss function further comprises penalty terms for any overlap between the first type of lesions and the second type of lesions and contribution of false positives from the first convolutional neural network and the second convolutional neural network.

11. The computer-implemented method of claim 1, wherein the first convolutional neural network and the second convolutional neural network are U-Nets.

12. The computer-implemented method of claim 1, wherein the three-dimensional MRI image comprises multiple contiguous slices stacked along a channel dimension, wherein the contiguous slices comprise a first three-dimensional MRI slice generated using a first type of MRI sequence, a second three-dimensional MRI slice generated using a second type of MRI sequence, and a third three-dimensional MRI slice generated using a third type of MRI sequence.

13. The computer-implemented method of claim 12, wherein the first type of MRI sequence is T1 post-contrast, the second type of MRI sequence is T1 pre-contrast, and the third type of MRI sequence is fluid-attenuated inversion recovery.

14. The computer-implemented method of claim 12, wherein the first three-dimensional MRI slice and the second three-dimensional MRI slice are normalized to capture contrast enhancement, where the normalization comprises using a mean and standard deviation of the second three-dimensional MRI slice to z-score both a first three-dimensional MRI slice volume and a second three-dimensional slice volume.

15. The computer-implemented method of claim 1, further comprising:
  determining a count of a number of the first type of lesions using the first segmentation mask and a count of a number of the second type of lesions using the second segmentation mask.

16. The computer-implemented method of claim 1, further comprising:
  accessing data corresponding to a previous MRI;
  determining a change in a quantity, a size or cumulative size of one or more lesions using the first segmentation mask, the second segmentation mask, and/or the final image mask and the data; and
  generating an output that represents the change.

17. The computer-implemented method of claim 1, further comprising:
  providing an output corresponding to a possible or confirmed diagnosis of the subject of multiple sclerosis based at least in part on the first segmentation mask, the second segmentation mask, and/or the final image mask.

18. The computer-implemented method of claim 1, further comprising:
  evaluating and/or predicting a treatment response based at least in part on the first segmentation mask, the second segmentation mask, and/or the final image mask.

19. A system comprising:
  one or more data processors; and
  a non-transitory computer readable storage medium containing instructions which, when executed on the one or more data processors, cause the one or more data processors to perform a set of actions including:
    accessing a three-dimensional magnetic resonance imaging (MRI) image, wherein the three-dimensional MRI image depicts a region of a brain of a subject, wherein the region of the brain includes at least a first type of lesions and a second type of lesions;
    inputting the three-dimensional MRI image into a machine-learning model comprising a first convolutional neural network and a second convolutional neural network, wherein the first convolutional neural network is connected to the second convolutional neural network with one or more cross network connections between one or more layers of the first convolutional neural network and one or more layers of the second convolutional neural network;
    generating a first segmentation mask for the first type of lesions, using the first convolutional neural network that takes as input the three-dimensional MRI image, wherein the first segmentation mask comprises first estimated segmentation boundaries around depictions of the first type of lesions;
    generating a second segmentation mask for the second type of lesions, using the second convolutional neural network that takes as input the three-dimensional MRI image, wherein the second segmentation mask comprises second estimated segmentation boundaries around depictions of the second type of lesions, and wherein the first segmentation mask and the second segmentation mask are generated in parallel and a set of extracted features are shared across the one or more cross network connections while the first segmentation mask and the second segmentation mask are generated; and
    outputting the first segmentation mask and the second segmentation mask.

20. A computer-program product tangibly embodied in a non-transitory machine-readable storage medium, including instructions configured to cause one or more data processors to perform a set of actions including:
  accessing a three-dimensional magnetic resonance imaging (MRI) image, wherein the three-dimensional MRI image depicts a region of a brain of a subject, wherein the region of the brain includes at least a first type of lesions and a second type of lesions;
  inputting the three-dimensional MRI image into a machine-learning model comprising a first convolutional neural network and a second convolutional neural network, wherein the first convolutional neural network is connected to the second convolutional neural network with one or more cross network connections between one or more layers of the first convolutional neural network and one or more layers of the second convolutional neural network;
  generating a first segmentation mask for the first type of lesions, using the first convolutional neural network that takes as input the three-dimensional MRI image, wherein the first segmentation mask comprises first estimated segmentation boundaries around depictions of the first type of lesions;
  generating a second segmentation mask for the second type of lesions, using the second convolutional neural network that takes as input the three-dimensional MRI image, wherein the second segmentation mask comprises second estimated segmentation boundaries around depictions of the second type of lesions, and wherein the first segmentation mask and the second segmentation mask are generated in parallel and a set of extracted features are shared across the one or more cross network connections while the first segmentation mask and the second segmentation mask are generated; and
  outputting the first segmentation mask and the second segmentation mask.

\* \* \* \* \*